(12) United States Patent
Bielby

(10) Patent No.: US 12,449,809 B2
(45) Date of Patent: *Oct. 21, 2025

(54) SYSTEMS AND METHODS FOR EVALUATING AND SHARING AUTONOMOUS VEHICLE DRIVING STYLE INFORMATION WITH PROXIMATE VEHICLES

(71) Applicant: Lodestar Licensing Group LLC, Burlingame, CA (US)

(72) Inventor: Robert Richard Noel Bielby, Placerville, CA (US)

(73) Assignee: Lodestar Licensing Group LLC, Evanston, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/345,600

(22) Filed: Jun. 30, 2023

(65) Prior Publication Data

US 2023/0341855 A1 Oct. 26, 2023

Related U.S. Application Data

(63) Continuation of application No. 17/321,349, filed on May 14, 2021, now Pat. No. 11,693,408, which is a continuation of application No. 15/921,491, filed on Mar. 14, 2018, now Pat. No. 11,009,876.

(51) Int. Cl.
| | | |
|---|---|---|
| G05D 1/00 | (2024.01) | |
| B60W 30/18 | (2012.01) | |
| B60W 50/08 | (2020.01) | |
| G07C 5/00 | (2006.01) | |

(52) U.S. Cl.
CPC .......... *G05D 1/0088* (2013.01); *B60W 30/18* (2013.01); *B60W 50/085* (2013.01); *G07C 5/008* (2013.01); *B60W 2556/50* (2020.02); *B60W 2556/65* (2020.02)

(58) Field of Classification Search
CPC .................................................. G05D 1/0088
See application file for complete search history.

(56) References Cited

U.S. PATENT DOCUMENTS

| | | |
|---|---|---|
| 6,023,653 A | 2/2000 | Ichimura et al. |
| 8,185,296 B2 | 5/2012 | Yokoyama et al. |
| 8,442,791 B2 | 5/2013 | Stahlin |

(Continued)

OTHER PUBLICATIONS

International Search Report and Written Opinion, PCT/US2019/025112, mailed Jul. 19, 2019.

*Primary Examiner* — Michael A Berns
(74) *Attorney, Agent, or Firm* — Greenberg Traurig

(57) ABSTRACT

Systems and methods for characterizing a driving style of an autonomous vehicle are presented. A system may include one or more sensors configured to collect information concerning driving characteristics; a memory containing computer-readable instructions for evaluating the driving characteristics for a pattern(s) correlatable with a driving style of the autonomous vehicle and for characterizing aspects of driving style based on the one or more patterns; and a processor configured to evaluate the driving characteristics for the one or more patterns correlatable with the driving style, and characterize aspects of the driving style based on the pattern(s). Corresponding methods and non-transitory media are disclosed.

20 Claims, 12 Drawing Sheets

(56) References Cited

U.S. PATENT DOCUMENTS

| | | |
|---|---|---|
| 8,543,320 B2 | 9/2013 | Zheng et al. |
| 8,688,369 B2 | 4/2014 | Denaro |
| 8,825,371 B2 | 9/2014 | Prokhorov et al. |
| 9,043,127 B2 | 5/2015 | Denaro |
| 9,062,977 B2 | 6/2015 | Prokhorov et al. |
| 9,221,461 B2 | 12/2015 | Ferguson et al. |
| 9,279,688 B2 | 3/2016 | Denaro |
| 9,296,299 B2 | 3/2016 | Ricci |
| 9,754,501 B2 | 9/2017 | Stenneth |
| 9,786,172 B2 | 10/2017 | Takahara et al. |
| 9,797,735 B2 | 10/2017 | Denaro |
| 9,805,601 B1 | 10/2017 | Fields et al. |
| 9,961,551 B2 | 5/2018 | Scholl et al. |
| 10,031,523 B2 | 7/2018 | Ricci et al. |
| 10,049,328 B2 | 8/2018 | Jiang et al. |
| 10,068,477 B2 | 9/2018 | Miller et al. |
| 10,099,697 B2 | 10/2018 | Tatourian et al. |
| 10,139,831 B2 | 11/2018 | Yan |
| 10,179,586 B2 | 1/2019 | Johnson |
| 10,215,571 B2 | 2/2019 | Ghadiok et al. |
| 10,223,380 B2 | 3/2019 | Giurgiu et al. |
| 10,257,270 B2 | 4/2019 | Cohn et al. |
| 10,269,242 B2 | 4/2019 | Ahmad et al. |
| 10,298,741 B2 | 5/2019 | Goren et al. |
| 10,311,728 B2 | 6/2019 | Stenneth et al. |
| 10,331,141 B2 | 6/2019 | Grimm et al. |
| 10,345,110 B2 | 7/2019 | Westover et al. |
| 10,460,394 B2 | 10/2019 | Perl et al. |
| 10,518,720 B2 | 12/2019 | Haque |
| 10,522,038 B2 * | 12/2019 | Bielby ............... G08G 1/04 |
| 10,529,231 B2 | 1/2020 | Scofield |
| 10,543,853 B2 | 1/2020 | Toyoda et al. |
| 10,642,278 B2 * | 5/2020 | Matsui ............... G05D 1/0274 |
| 10,648,818 B2 | 5/2020 | Denaro |
| 10,755,111 B2 * | 8/2020 | Golov ............... G06N 3/045 |
| 10,807,592 B2 * | 10/2020 | Golov ............... G06V 20/584 |
| 10,997,429 B2 * | 5/2021 | Golov ............... G06V 20/56 |
| 11,004,339 B2 | 5/2021 | Oe et al. |
| 11,009,876 B2 * | 5/2021 | Bielby ............... G05D 1/0088 |
| 11,072,343 B2 | 7/2021 | Emura et al. |
| 11,117,593 B2 * | 9/2021 | Kondo ............... G06F 16/29 |
| 11,161,518 B2 * | 11/2021 | Golov ............... B60T 8/885 |
| 11,163,309 B2 * | 11/2021 | Tay ............... G01S 17/931 |
| 11,393,215 B2 * | 7/2022 | Sawada ............... B64U 80/86 |
| 11,693,408 B2 * | 7/2023 | Bielby ............... B60W 50/082 701/23 |
| 11,727,794 B2 * | 8/2023 | Bielby ............... G08G 1/017 701/119 |
| 2008/0189040 A1 | 8/2008 | Nasu et al. |
| 2010/0099353 A1 | 4/2010 | Komori |
| 2011/0302214 A1 | 12/2011 | Frye et al. |
| 2012/0109517 A1 | 5/2012 | Watanabe |
| 2012/0296560 A1 | 11/2012 | Zheng et al. |
| 2014/0067187 A1 | 3/2014 | Ferguson et al. |
| 2014/0172290 A1 | 6/2014 | Prokhorov et al. |
| 2015/0039365 A1 | 2/2015 | Haque |
| 2015/0057838 A1 | 2/2015 | Scholl et al. |
| 2016/0150070 A1 | 5/2016 | Goren et al. |
| 2016/0176440 A1 | 6/2016 | Witte et al. |
| 2016/0280224 A1 | 9/2016 | Tatourian et al. |
| 2016/0351050 A1 | 12/2016 | Takahara et al. |
| 2016/0363935 A1 | 12/2016 | Shuster et al. |
| 2017/0015318 A1 | 1/2017 | Scofield et al. |
| 2017/0277716 A1 | 9/2017 | Giurgiu et al. |
| 2017/0310747 A1 | 10/2017 | Cohn et al. |
| 2017/0316691 A1 | 11/2017 | Miller et al. |
| 2017/0372431 A1 | 12/2017 | Perl et al. |
| 2018/0004223 A1 | 1/2018 | Baldwin |
| 2018/0018869 A1 | 1/2018 | Ahmad et al. |
| 2018/0038698 A1 | 2/2018 | Denaro |
| 2018/0047285 A1 | 2/2018 | Johnson |
| 2018/0335785 A1 | 11/2018 | Miller et al. |
| 2019/0009794 A1 | 1/2019 | Toyoda et al. |
| 2019/0047584 A1 | 2/2019 | Donnelly |
| 2019/0049257 A1 | 2/2019 | Westover et al. |
| 2019/0051172 A1 | 2/2019 | Stenneth et al. |
| 2019/0064843 A1 | 2/2019 | Matsui et al. |
| 2019/0077413 A1 | 3/2019 | Kondo et al. |
| 2019/0147252 A1 | 5/2019 | Sawada et al. |
| 2019/0196481 A1 | 6/2019 | Tay et al. |
| 2019/0236379 A1 | 8/2019 | Golov et al. |
| 2019/0286133 A1 | 9/2019 | Bielby |
| 2019/0287392 A1 | 9/2019 | Bielby |
| 2019/0300017 A1 | 10/2019 | Glaser et al. |
| 2019/0316913 A1 | 10/2019 | Golov |
| 2019/0382004 A1 | 12/2019 | Golov |
| 2019/0382029 A1 | 12/2019 | Golov |
| 2020/0387722 A1 | 12/2020 | Golov et al. |
| 2021/0271243 A1 | 9/2021 | Bielby |
| 2023/0341855 A1 * | 10/2023 | Bielby ............... B60W 40/10 |

* cited by examiner

Tap Here to Change Driving Experience Parameters

Please Rate The Following Characteristics Throughout Your Trip

- Efficiency Navigating Traffic
- Following Distance
- Braking
- Acceleration
- Speed
- Pedestrians
- Obstacles

*FIG. 3*

SYSTEMS AND METHODS FOR EVALUATING AND SHARING AUTONOMOUS VEHICLE DRIVING STYLE INFORMATION WITH PROXIMATE VEHICLES

RELATED APPLICATIONS

The present application is a continuation application of U.S. patent application Ser. No. 17/321,349, filed on May 14, 2021, issued as U.S. Pat. No. 11,693,408 on Jul. 4, 2023, which is a continuation application of U.S. patent application Ser. No. 15/921,491, filed Mar. 14, 2018, issued as U.S. Pat. No. 11,009,876 on May 18, 2021, and entitled "SYSTEMS AND METHODS FOR EVALUATING AND SHARING AUTONOMOUS VEHICLE DRIVING STYLE INFORMATION WITH PROXIMATE VEHICLES," the entire disclosure of which application is hereby incorporated herein by reference.

BACKGROUND

Driving styles vary from autonomous vehicle to autonomous vehicle, especially due to differences in control system programming and sensing capabilities. These variations in autonomous vehicle driving style can be difficult to predict by nearby drivers or by nearby autonomous vehicles, often leading to close calls and accidents, as well as unpleasant rider experiences due to frustration with the driving style of the autonomous vehicle. Therefore, there is a need for improved ways for assessing the driving style of autonomous vehicles in order to improve safety and the driving experience.

SUMMARY

The present disclosure is directed to a system for characterizing a driving style of an autonomous vehicle. The system, in various embodiments, may comprise one or both of: (i) one or more sensors configured to collect information concerning driving characteristics associated with operation of an autonomous vehicle, and (ii) a user interface configured for receiving feedback from an occupant of the autonomous vehicle concerning driving characteristics associated with operation of the autonomous vehicle. The system may further include a memory containing computer-readable instructions for evaluating the information concerning driving and/or the occupant feedback for one or more patterns correlatable with a driving style of the autonomous vehicle and for characterizing aspects of the driving style of the autonomous vehicle based on the one or more patterns, as well as a processor configured to: read the computer-readable instructions from the memory, evaluate the driving characteristics and/or occupant feedback for one or more patterns correlatable with the driving style of the autonomous vehicle, and characterize aspects of the driving style of the autonomous vehicle based on the one or more patterns.

The information concerning driving characteristics, in various embodiments may include identifiable metrics regarding how an autonomous control system operates the vehicle. Representative examples may include without limitation one or a combination of vehicle speed, vehicle acceleration, vehicle location, braking force, braking deceleration, vehicle speed relative to speed limit, vehicle speed in construction zones, vehicle speed in school zones, lane departures, relative speed to a vehicle driving ahead, relative distance to a vehicle driving ahead, and relative acceleration to a vehicle driving ahead.

The aspects of the driving style of the autonomous vehicle, in various embodiments, may include one or more patterns or tendencies derived from the collected driving characteristics. Representative examples may include without limitation one or a combination of rapid acceleration and braking, following closely, dangerously changing lanes or changing lanes without signaling, drifting out of a traffic lane, exceeding the speed limit, driving well under the speed limit, accelerating very slowly from stops, late braking, and a number, severity, and timing of traffic accidents.

The processor, in various embodiments, may be located onboard the autonomous vehicle. In some embodiments, the system may further include a transmitter on the autonomous vehicle for transmitting the aspects of the driving style of the autonomous vehicle to a nearby vehicle or to a remote server. In an embodiment, the driving style is transmitted to a remote server and the remote server may transmit the driving style to a nearby vehicle.

The processor, in various other embodiments, may be located on a nearby vehicle. In an embodiment, the system may further include a transmitter on the autonomous vehicle for transmitting the information concerning driving characteristics and/or the occupant feedback to the processor located on the nearby vehicle.

The processor, in still further embodiments, may be located at a remote server. In some embodiments, the system may further include a transmitter on the autonomous vehicle for transmitting the information concerning driving characteristics and/or the occupant feedback to the processor located at the remote server. The processor at the remote server, in an embodiment, may evaluate the driving characteristics and/or the occupant feedback for the one or more patterns and characterize aspects of the driving style of the autonomous vehicle. The remote server, in an embodiment, may be configured to transmit the aspects of the driving style of the autonomous vehicle to a nearby vehicle.

In various embodiments, the processor may be further configured to automatically generate a warning communicable to a human operating the nearby vehicle based on a preferred driving experience of the human operating the nearby vehicle. Additionally or alternatively, the processor, in various embodiments, may be further configured to automatically identify one or more options for adjusting an operation of the nearby autonomous vehicle based on a preferred driving experience of an occupant of the nearby autonomous vehicle.

In another aspect, the present disclosure is directed to a method for characterizing a driving style of an autonomous vehicle. The method, in various embodiments, may comprise one or both of: (i) collecting information concerning driving characteristics associated with operation of a vehicle by a human, and (ii) receiving feedback from an occupant of the autonomous vehicle concerning driving characteristics associated with operation of the autonomous vehicle. The method may further comprise evaluating the information concerning driving characteristics and/or the occupant feedback for one or more patterns correlatable with a driving style of the autonomous vehicle, as well as characterizing aspects of the driving style of the autonomous vehicle based on the one or more patterns.

In various embodiments, the steps of evaluating and characterizing may be performed onboard or offboard the autonomous vehicle. In some offboard embodiments, the method may include sharing, with a nearby vehicle or remote server, the information concerning driving characteristics and/or the occupant feedback.

The method, in various embodiments, may further include automatically generating a warning communicable to a human operating a nearby vehicle based on a preferred driving experience of the human operating the nearby vehicle. In various embodiments involving nearby autonomous vehicles, the method may further include automatically identifying one or more options for adjusting an operation of a nearby autonomous vehicle based on a preferred driving experience of an occupant of the nearby autonomous vehicle.

In yet another aspect, the present disclosure is directed to a non-transitory machine readable medium storing instructions that, when executed on a computing device, cause the computing device to perform a method for characterizing a driving style of an autonomous vehicle. The method performed by the computing device, in various embodiments, may comprise one or both of: (i) collecting information concerning driving characteristics associated with operation of a vehicle by a human, and (ii) receiving feedback from an occupant of the autonomous vehicle concerning driving characteristics associated with operation of the autonomous vehicle. The method may further comprise evaluating the information concerning driving characteristics and/or the occupant feedback for one or more patterns correlatable with a driving style of the autonomous vehicle, as well as characterizing aspects of the driving style of the autonomous vehicle based on the one or more patterns.

BRIEF DESCRIPTION OF DRAWINGS

FIG. 3 is a schematic illustration of an interface for receiving input from an occupant(s) of the autonomous vehicle regarding the occupant's evaluation of the autonomous vehicle's driving style throughout a trip, according to an embodiment of the present disclosure;

DETAILED DESCRIPTION

Figure 1:
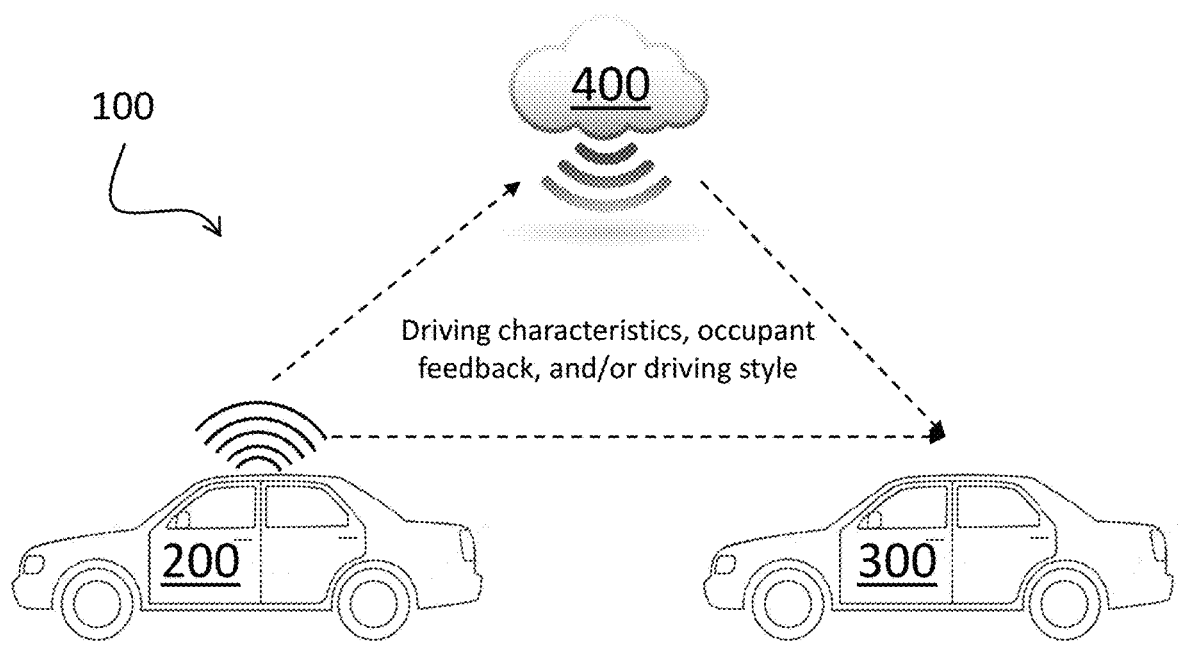
FIG. 1 schematically depicts a representative system for collecting, evaluating, and sharing information concerning the driving style of an autonomous vehicle with nearby vehicles, according to an embodiment of the present disclosure.

Embodiments of the present disclosure include systems and methods for characterizing aspects of the driving style of an autonomous vehicle and sharing that information with surrounding vehicles to improve safety and enhance the driving experience. In particular, the present systems and methods may be configured to evaluate characteristics of how a particular autonomous vehicle—and more specifically, its control system—is currently driving and/or has driven in the recent past in order to identify patterns and other relevant information indicative of that particular autonomous vehicle's driving style under various circumstances. Driving style information can be shared with surrounding autonomous and/or human-piloted vehicles for consideration by their respective autonomous control systems and human drivers. By better understanding the driving style of a particular autonomous vehicle, nearby autonomous vehicles and human drivers can take action to improve safety and enhance the driving experience, as later described in more detail.

Within the scope of the present disclosure, the term "autonomous vehicle" and derivatives thereof generally refer to vehicles such as cars, trucks, motorcycles, aircraft, and watercraft that are piloted by a computer control system either primarily or wholly independent of input by a human during at least a significant portion of a given trip. Accordingly, vehicles having "autopilot" features during the cruising phase of a trip (e.g., automatic braking and accelerating, maintenance of lane) may be considered autonomous vehicles during such phases of the trip where the vehicle is primarily or wholly controlled by a computer independent of human input. Autonomous vehicles may be manned (i.e., one or more humans riding in the vehicle) or unmanned (i.e., no humans present in the vehicle). By way of illustrative example, and without limitation, autonomous vehicles may include so called "self-driving" cars, trucks, air taxis, drones, and the like.

Within the scope of the present disclosure, the terms "piloted vehicle", "human-piloted vehicle," and derivatives thereof generally refer to vehicles such as, without limitation, cars, trucks, motorcycles, aircraft, and watercraft that are wholly or substantially piloted by a human. For clarity, vehicles featuring assistive technologies such as automatic braking for collision avoidance, automatic parallel parking, cruise control, and the like shall be considered piloted vehicles to the extent that a human is still responsible for controlling significant aspects of the motion of the vehicle in the normal course of driving. A human pilot may be present in the piloted vehicle or may remotely pilot the vehicle from another location via wireless uplink.

Within the scope of the present disclosure, the term "driving style" and derivatives thereof generally refer to patterns or tendencies indicative of the way a particular autonomous vehicle is controlled. Understanding aspects of the autonomous vehicle's driving style may, in turn, be useful to proximate vehicles for enhancing safety or driving experience. These characteristics may be identified over a period of time, such as over the course of a current trip and/or over the course of numerous trips occurring over the past week, month, year, etc., as appropriate. Driving characteristics can be evaluated for patterns and tendencies that other drivers and autonomous vehicles may wish to consider from safety and driving experience perspectives.

Driving style for an autonomous vehicle can be characterized, in various embodiments, as the autonomous vehicle's propensity or tendency for certain actions that may diminish the driving experience or safety of its occupants or that of other vehicles and pedestrians. Such tendencies may be especially noticeable at the outset of the adoption of autonomous vehicles onto our roadways, as the autonomous vehicles function less intuitively than human drivers as they struggle to understand the dynamics of their surrounding environments and of various traffic scenarios, and how to respond to them safely and efficiently. Representative examples include dangerous actions, actions frustrating to other drivers, inefficient actions, or actions that otherwise negatively impact the driving experience and/or safety of nearby vehicles and/or pedestrians.

In many cases, such actions may result from sub-optimal programming or sensing capabilities, while in other cases, such action may result from intentional programming either by the manufacturer or via an occupant's selection of certain driving experience criteria. Referring to the former, an autonomous vehicle may lack the programming or enough sensor data to be able to understand what is going on in its surrounding environment, and in response brakes erratically, or opts to stop or drive very slowly until it is again confident to proceed normally. Similarly, the autonomous vehicle may not have sufficient information or the programming to understand that options are available for passing a slow or timid driver, and thus continues to follow the slow or timid driver to the frustration of the autonomous vehicle's occupant(s). With reference to intentional "unfavorable" actions (at least from the standpoint of surrounding vehicles and pedestrians), some autonomous vehicles may be programmed for aggressive actions such as rapidly accelerating and braking, following closely, aggressive lane changes, speeding, etc. Likewise, driving style may be characterized by a particular driver's tendencies for other dangerous or frustrating actions, such as driving well under the speed limit, accelerating very slowly from stops, stop-and-go like transitions in traffic rather than smooth accelerations and braking, late braking, etc. Additionally or alternatively, driving style can be characterized based on information concerning the autonomous vehicle's safety record, such as the number of accidents in which it has been involved, the nature of those accidents, and how recent those accidents were.

Likewise, driving style can additionally or alternatively be characterized as the autonomous vehicle's propensity or tendency for avoiding certain unfavorable actions or favorably performing certain actions, both of which may enhance the driving experience or safety of its occupants or that of other vehicles and pedestrians. Many autonomous vehicles will eventually master certain environments and traffic scenarios as more empirical data is gathered and better sensing/control suites are developed, but some will operate better than others overall and on a situation-by-situation basis. This is especially true if autonomous vehicle controls systems and the vehicles themselves are developed by independent entities (e.g., auto manufacturers) as opposed to all vehicles and control systems being identical and maintained by a single entity (e.g., the government). Accordingly, understanding what a given autonomous vehicle is good at can be just as useful as understanding what it is bad at, as now nearby human drivers and autonomous vehicles can make corresponding adjustments that leverage the good aspects of the autonomous vehicle's driving style to enhance its own driving experience. For example, a nearby human driver may opt to follow an autonomous vehicle that has a driving style characterized by efficient navigation of urban environments as opposed to taking a less optimal route to avoid the autonomous vehicle having assumed the driving style of the autonomous vehicle is timid or erratic in urban environments.

It should be recognized that driving style information may include any other information concerning identifiable characteristics of the way a particular autonomous vehicle is controlled that may be useful to proximate vehicles for enhancing safety or driving experience.

Within the scope of the present disclosure, the term "driving experience" and derivatives thereof generally refer to characteristics of the trip experienced by occupant(s) (e.g., drivers, passengers, cargo) of surrounding vehicles, whether piloted or autonomous. Occupants, owners, or operators of surrounding vehicles may have certain preferences concerning how the trip is conducted and thus may wish to be warned of and/or have their vehicle automatically respond to the presence of nearby autonomous vehicles having driving styles that may interfere with those preferences. Representative examples of driving experience preferences may include, without limitation, preferences concerning trip duration, trip smoothness (e.g., steady vs. stop-and-go), efficiency of power or fuel consumption, and tolerance levels for safety risks. While the present disclosure may frequently refer to an occupant's driving style preferences, this simplification is made for ease of explanation, and it should be understood that driving experience preferences may likewise be associated with persons and/or entities not present in the vehicle, such as the manufacturer, owners, or remote operator or manager of the piloted or autonomous vehicle. For example, an operator or manager, such as a remote pilot or fleet manager, respectively, may have driving experience preferences for the vehicle.

Further embodiments of the present disclosure include systems and methods for automatically generating warnings and/or automatically adjusting operation of vehicles near the autonomous vehicle in response to receiving driving style information the autonomous vehicle. Whether a response is executed and the nature of that response may depend at least in part on the preferred driving experience of occupants of the surrounding vehicles. In particular, the present systems and methods may be configured, in one aspect, to automatically generate and present warnings to occupants. For example, when an autonomous vehicle with a historically aggressive driving style is nearby, a warning could be displayed and/or sounded to alert the receiving vehicle's driver so that he/she may decide whether to take action (e.g., move over, slow down) for minimizing risk of collision with the historically aggressive autonomous vehicle. In another aspect, the present systems and methods may be configured to automatically identify suitable adjustments to the current operation of an autonomous vehicle in response to the driving style of the nearby autonomous vehicle. Tracking the immediately preceding example, the system may identify, and in some cases automatically implement, one or more controls adjustments (e.g., move over, slow down) suitable for enhancing the driving experience of occupants of the receiving autonomous vehicle. The system may consider safety and/or aspects of the manufacturer's and/or occupant's preferred driving experience in determining said controls adjustments, as later described in more detail.

FIG. 1 schematically depicts a representative system for collecting, evaluating, and sharing information concerning the driving style of an autonomous vehicle with nearby vehicles. In particular, system 100 may be configured for collecting information concerning driving characteristics associated with an autonomous vehicle 200, and additionally or alternatively, feedback from occupants of autonomous vehicle 200 regarding driving characteristics of the autonomous vehicle 200, as later described. The driving characteristics and/or feedback can be evaluated at various locations throughout system 100 for patterns and other information useful in characterizing the driving style of the autonomous vehicle 200, such as onboard autonomous vehicle 200, onboard nearby autonomous or piloted vehicle 300, or at a remote server 400. The patterns and other information can be used to characterize aspects of the driving style of autonomous vehicle 200 which, in turn, can be utilized by nearby piloted or autonomous vehicles 300 for enhancing their respective driving experiences, as later described in more detail.

Collecting Driving Characteristics

Figure 2:
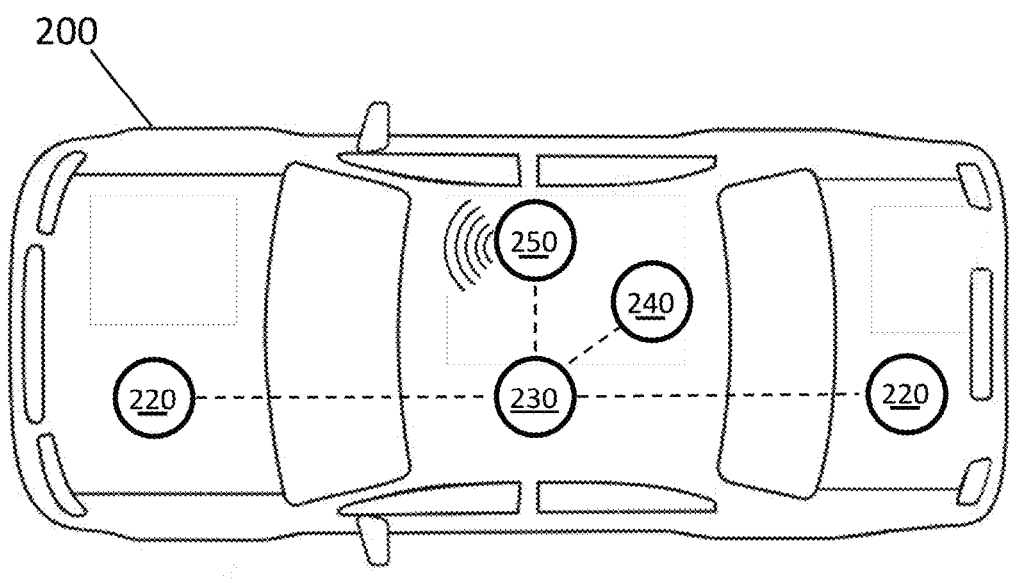
FIG. 2 is a schematic illustration of a sensing system onboard an autonomous vehicle for collecting information concerning how the autonomous vehicle operates during current and previous trips, according to an embodiment of the present disclosure.

FIG. 2 is a schematic illustration of a sensing system located onboard vehicle 200 for collecting information concerning how autonomous vehicle 200 is operated during current and previous trips (hereinafter "driving characteristics"). The sensing system, in various embodiments, may generally include one or more sensors 220, a processor 230, memory 240, and a transmitter 250.

The sensing system, in various embodiments, may include one or more sensors 220 configured to collect information regarding operational aspects of autonomous vehicle 200, such as speed, vehicle speed, vehicle acceleration, braking force, braking deceleration, and the like. Representative sensors configured to collect information concerning operational driving characteristics may include, without limitation, tachometers like vehicle speed sensors or wheel speed sensor, brake pressure sensors, fuel flow sensors, steering angle sensors, and the like.

The sensing system, in various embodiments, may additionally or alternatively include one or more sensors 220 configured to collect information regarding the static environment in which autonomous vehicle 200 is operated, such as the presence and content of signage and traffic signals (e.g., stop signs, construction zones, speed limit signs, stop lights), road lane dividers (e.g., solid and dashed lane lines), and the like. Representative sensors configured to collect such static operating environment information may include outward-facing cameras positioned and oriented such that their respective fields of view can capture the respective information each is configured to collect. For example, a camera configured to capture surrounding signage may be configured towards the front of or on top of autonomous vehicle 200 and oriented forward-facing (e.g., straight ahead or perhaps canted sideways by up to about 45 degrees) so as to capture roadside and overhead signage/traffic signals within its field of view as autonomous vehicle 200 travels forward. As another example, cameras configured to capture road lane dividers may be positioned on the side of or off a front/rear quarter of autonomous vehicle 200 and may be oriented somewhat downwards so as to capture road lane dividers on both sides of vehicle autonomous 200. Additional representative sensors for collecting static operating environment information may include receivers configured to receive wireless signals from base stations or other transmitters communicating information that may ordinarily be found on signage or otherwise related to the static operating environment of autonomous vehicle 200. Likewise, global positioning system (GPS) or other location-related sensors may be utilized to collect information regarding the static environment in which vehicle 200 is operated, such as what street autonomous vehicle 200 is driving on, whether that street is a traffic artery (e.g., highway) or other type, and whether that location is in an urban or rural area.

The sensing system, in various embodiments, may additionally or alternatively include one or more sensors 220 configured to collect information regarding the dynamic environment in which autonomous vehicle 200 is operated, such as information concerning the presence of other nearby vehicles such as each vehicle's location, direction of travel, rate of speed, and rate of acceleration/deceleration, as well as similar information concerning the presence of nearby pedestrians. Representative sensors configured to collect such dynamic operating environment information may include outward-facing cameras positioned and oriented such that their respective fields of view can capture the respective information each is configured to collect. For example, outward-facing cameras may be positioned about the perimeter of autonomous vehicle 200 (e.g., on the front, rear, top, sides, and/or quarters) to capture imagery to which image processing techniques such as vehicle recognition algorithms may be applied. Additionally or alternatively, one or more optical sensors (e.g., LIDAR, infrared), sonic sensors (e.g., sonar, ultrasonic), or similar detection sensors may be positioned about the vehicle for measuring dynamic operating environment information such as distance, relative velocity, relative acceleration, and similar characteristics of the motion of nearby piloted or autonomous vehicles 300.

The sensing system, in various embodiments, may leverage as sensor(s) 220 those sensors typically found in most autonomous vehicles such as, without limitation, those configured for measuring speed, RPMs, fuel consumption rate, and other characteristics of the vehicle's operation, as well as those configured for detecting the presence of other vehicles or obstacles proximate the vehicle. Sensors 220 may additionally or alternatively comprise aftermarket sensors installed on autonomous vehicle 200 for facilitating the collection of additional information for purposes relate or unrelated to evaluating driving style.

The sensing system of vehicle 200, in various embodiments, may further comprise an onboard processor 230, onboard memory 240, and an onboard transmitter 250. Generally speaking, in various embodiments, processor 230 may be configured to execute instructions stored on memory 240 for processing information collected by sensor(s) 200 for subsequent transmission offboard vehicle 200. Onboard processor 230, in various embodiments, may additionally or alternatively be configured to execute instructions stored on memory 240 for processing information from two or more sensors 220 to produce further information concerning driving characteristics associated with autonomous vehicle 200. For example, in an embodiment, processor 230 may process operational characteristics, such as braking deceleration, alongside dynamic environment characteristics, such as following distance, to determine for example whether instances of hard braking are associated with following another vehicle too closely as opposed to more innocuous circumstances such as attempts to avoid debris or an animal suddenly appearing in the roadway. It should be recognized that this is merely an illustrative example, and that one of ordinary skill in the art will recognize further ways sensor data may be processed by processor 130 to produce further information concerning driving characteristics associated with autonomous vehicle 200 in light of the teachings of the present disclosure.

Processor 230, in various embodiments, may be configured to pre-process information from sensor(s) 220 for subsequent offboard transmission via transmitter 250. Pre-processing activities may include one or a combination of filtering, organizing, and packaging the information from sensors 220 into formats and communications protocols for efficient wireless transmission. In such embodiments, the pre-processed information may then be transmitted offboard vehicle 200 by transmitter 250 in real-time or at periodic intervals, where it may be received by nearby piloted or autonomous vehicles 300 and/or remote server 400 as later described in more detail. It should be appreciated that transmitter 250 may utilize short-range wireless signals (e.g., Wi-Fi, BlueTooth) when configured to transmit the pre-processed information directly to nearby piloted or autonomous vehicles 300, and that transmitter 250 may utilize longer-range signals (e.g., cellular, satellite) when transmitting the pre-processed information directly to remote server 400, according to various embodiments later described. In some embodiments, transmitter 250 may additionally or alternatively be configured to form a local mesh network (not shown) for sharing information with multiple nearby piloted or autonomous vehicles 300, and perhaps then to remote server 400 via a wide area network access point. Transmitter 250 may of course use any wireless communications signal type and protocol suitable for transmitting the pre-processed information offboard vehicle 200 and to nearby piloted or autonomous vehicles 300 and/or remote server 400.

Like sensor(s) 220, in various embodiments, processor 230 and/or onboard transmitter 250 of system 100 may be integrally installed in vehicle 200 (e.g., car computer, connected vehicles), while in other embodiments, processor 230 and/or transmitter 250 may be added as an aftermarket feature.

Collecting Occupant Feedback on Driving Characteristics

FIG. 3 illustrates a representative user interface 202 used by an occupant(s) 210 of autonomous vehicle 200 to give feedback regarding driving characteristics of autonomous vehicle 200. In various embodiments, user interface 202 may be presented on a touchscreen 205 or other device integrated into autonomous vehicle 200, while in other embodiments, user interface 202 may be presented to occupant(s) 210 on a mobile device (e.g., occupant's mobile phone, tablet). Occupant feedback provided through a mobile device may be sent directly to processor 230 of autonomous vehicle 200 (e.g., via Bluetooth), directly to nearby piloted or autonomous vehicle 300, or to remote server 400, as later described in more detail.

User interface 202, in various embodiments, may provide occupant(s) 210 with various options for providing feedback on various driving characteristics of autonomous vehicle 200. For example, as shown in FIG. 3, occupant(s) 210 may be presented with icons associated with driving characteristics or autonomous vehicle 200 such as its efficiency in navigating traffic, following distance, braking behavior, acceleration behavior, speed, ability to detect pedestrians/obstacles and navigate accordingly. It should be recognized that these are merely illustrative examples, and that one of ordinary skill in the art will recognize additional driving characteristics of interest in light of the teachings of the present disclosure. In the example shown in FIG. 3, an occupant 210 may tap an icon and provide corresponding feedback. In an embodiment, feedback may be in the form of a rating, such as a rating of autonomous vehicle's 200 behavior with respect to the selected driving characteristic on a scale of 1-10.

User interface 202, in various embodiments, may be configured to receive feedback from occupant(s) 210 throughout the course of a given trip, thereby allowing system 100 to associate the feedback with the particular situational circumstances of the trip at that time. For example, consider that a current trip takes occupant(s) 210 from a suburban location with little traffic to an urban destination with heavy traffic. System 100, as configured, may associate occupant feedback from the former portion of the trip with low traffic conditions and suburban roadways, and feedback from the latter portion of the trip with heavy traffic conditions and urban roadways. Of course, system 100 can make far more detailed associations with any number of circumstances, such as the particular roadway, weather conditions, the specific positioning and actions of nearby vehicles and pedestrians around autonomous vehicle 200 at any given time, etc. By associating occupant feedback with the particular circumstances of the trip, system 100 may later pull historical feedback from historical trips (or portions thereof) having circumstances similar to the current circumstances of a current trip. That particular historical feedback and then be evaluated for use in characterizing aspects of autonomous vehicle's 200 driving style in the current situation, as later described in more detail.

System 100, in various embodiments, may also associate, with occupant feedback, any information occupant 210 had provided autonomous vehicle 200 at the time regarding its preferred driving experience. As configured, system 100 has a frame of reference for the feedback provided by occupant 210. For example, consider a trip in which autonomous vehicle 200 is transporting an occupant 210a who prefers a slow and safe driving experience. Occupant 210a provides autonomous vehicle 200 with its preferences concerning driving experience, and autonomous vehicle 200 attempts to provide a corresponding driving experience. Due to, for example, limitations in autonomous vehicle's 200 sensing and control capabilities, autonomous vehicle 200 tends to follow vehicles at a pretty far distance, and thus occupant 210a provides a favorable rating. Feedback regarding that driving characteristic (i.e., following distance) would be associated with the slow and safe preferences of occupant 210a. Now consider that the same autonomous vehicle 200 is transporting an occupant 210b later that day and occupant 210b prefers a fast and aggressive driving experience. Again, due to the aforementioned limitations though, autonomous vehicle 200 follows at a similar distance as before and thus occupant 210b provides a poor rating for following distance. Under the present example, system 100 could consider following distance feedback ratings in the context of the associated driving experience preferences, and thus interpret those ratings in a way that is useful for enhancing the driving experience of occupant(s) 310 of nearby vehicle 300 during a current trip. For example, consider that occupant(s) 310 prefers a fast and aggressive driving experience like occupant 210*b*. Because system 100 associated driving experience preferences with the historical feedback ratings, system 100 has the ability to see that occupants 210 from previous trips with similar driving experience preferences as occupant(s) 310 (e.g., occupant 210*b*) rated following distance poorly. As configured, system 100 can deduce that occupant(s) 310 would be frustrated by how far back autonomous vehicle 200 will likely follow other vehicles, and thus occupant(s) 310 can take action to pass or otherwise get out from behind autonomous vehicle 200. This, in turn, may enhance the preferred driving experience of occupant 310 during the current trip.

Onboard and/or Offboard Evaluation of Driving Characteristics

Referring now to FIGS. 4A-4E, in various embodiments, system 100 may be configured to evaluate driving characteristics associated with autonomous vehicle 200 for one or more patterns indicative of a particular driving style. According to various embodiments of the present disclosure, these evaluations may be performed either onboard autonomous vehicle 200 or at an offboard location, as explained in further detail below.

Figure 4A:
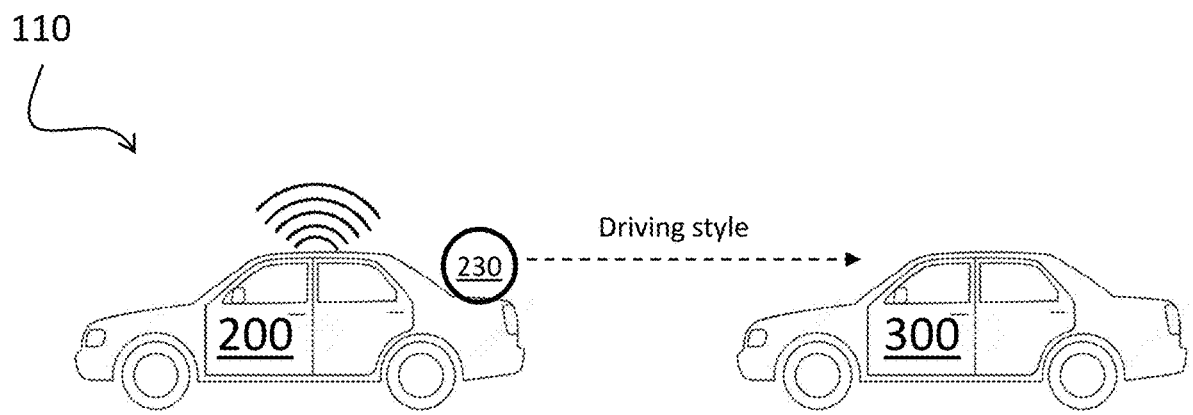
FIGS. 4A and 4B schematically illustrate embodiments of the system in which evaluation of driving characteristics occurs onboard the autonomous vehicle, according to an embodiment of the present disclosure.
Figure 4B:
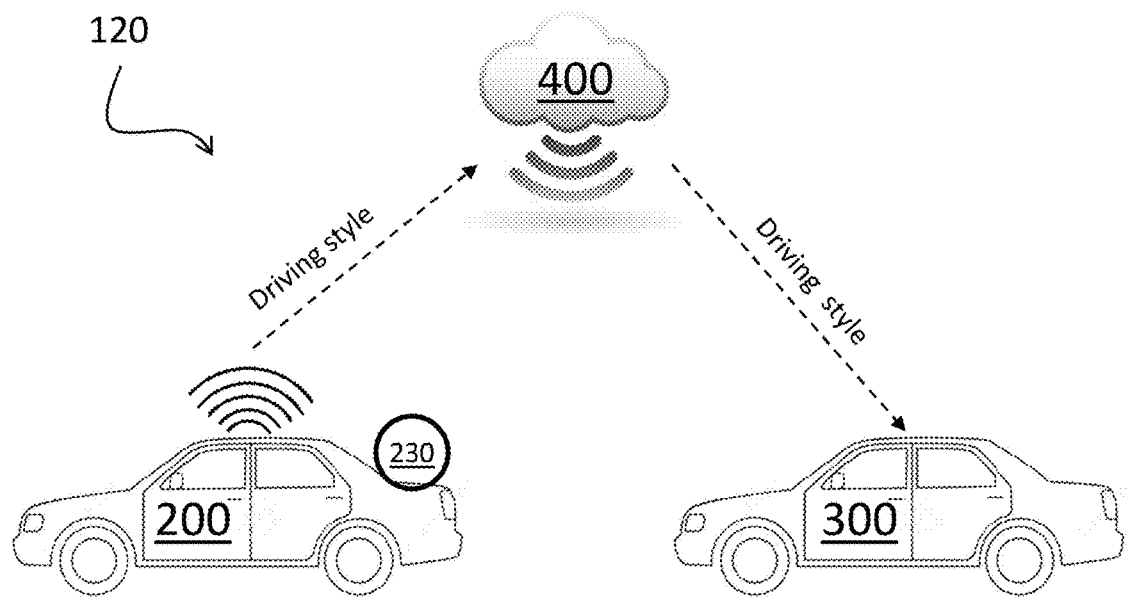

FIGS. 4A and 4B schematically illustrate embodiments 110 and 120, respectively, in which the evaluation of driving characteristics information may occur onboard autonomous vehicle 200. In one such embodiment, processor 230 may be configured to execute instructions stored on memory 240 for evaluating driving characteristics collected by sensor(s) 220 in accordance with methodologies later described in more detail. Additionally or alternatively, processor 230 may evaluate feedback provided by occupant(s) 210 of autonomous vehicle 200, whether provided via onboard user interface 205 or mobile device 215, in accordance with methodologies later described in more detail.

Patterns and other information relevant to characterizing driving style resulting from evaluation of the driving characteristics (or in some embodiments, characterizations of driving style itself) may then be transmitted to nearby piloted or autonomous vehicle 300 via transmitter 250. In embodiment 110, driving style information may be sent directly to nearby piloted or autonomous vehicle 300 as shown in FIG. 4A, whereas in embodiment 120, driving style information may be sent indirectly to nearby piloted or autonomous vehicle 300 via remote server 400 as shown in FIG. 4B. In the latter embodiment 120, remote server 400 may immediately relay the driving characteristics to nearby piloted or autonomous vehicle 300 or may store driving style information associated with autonomous vehicle 200 from the current and/or past trips. Remote server 400 may then transmit current and/or historical driving style information to nearby piloted or autonomous vehicle 300 when requested by nearby piloted or autonomous vehicle 300 or when directed to do so by autonomous vehicle 200.

It should be appreciated that embodiments in which driving characteristics are evaluated onboard vehicle 200 may have certain benefits. In many cases, one such benefit may be that transmitting driving style information may require less bandwidth than transmitting raw or pre-processed driving characteristics information, as in many cases driving style information may represent a more distilled version of driving characteristics information. Further, with reference to embodiment 120 in particular, it may be beneficial to transmit driving style information for storage on remote server 400. In one aspect, this may allow remote server 400 to offload storage responsibility from autonomous vehicle 200, thereby reducing the amount of memory (e.g., memory 240) required on vehicle 200. In another aspect, by storing driving style information on remote server 400, nearby piloted or autonomous vehicle 300 may access driving style information from remote server 400 without needing to establish a communications link with autonomous vehicle 200. First, this may improve security as it may be easier to implement robust security protocols and monitoring on communications between vehicles and remote server 400 than on vehicle-to-vehicle communications. Second, nearby piloted or autonomous vehicle 300 may be able to access driving style information stored in remote server 400 for at least past trips of autonomous vehicle 200 in the event autonomous vehicle 200 is unable to or otherwise does not establish communications links with remote server 400 or nearby piloted or autonomous vehicle 300 during the current trip. One of ordinary skill in the art may recognize further benefits to this architecture within the scope of present disclosure.

Figure 4C:
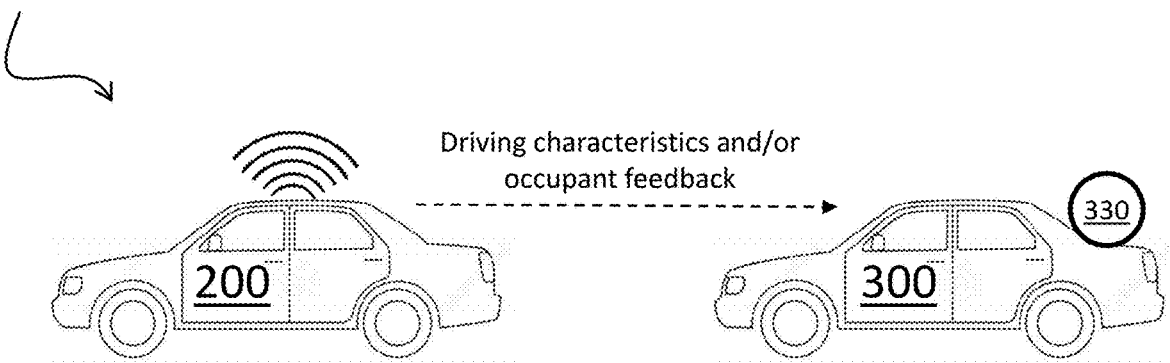
FIGS. 4C and 4D schematically illustrate embodiments of the system in which evaluation of driving characteristics occurs onboard a nearby piloted or autonomous vehicle, according to an embodiment of the present disclosure.
Figure 4D:
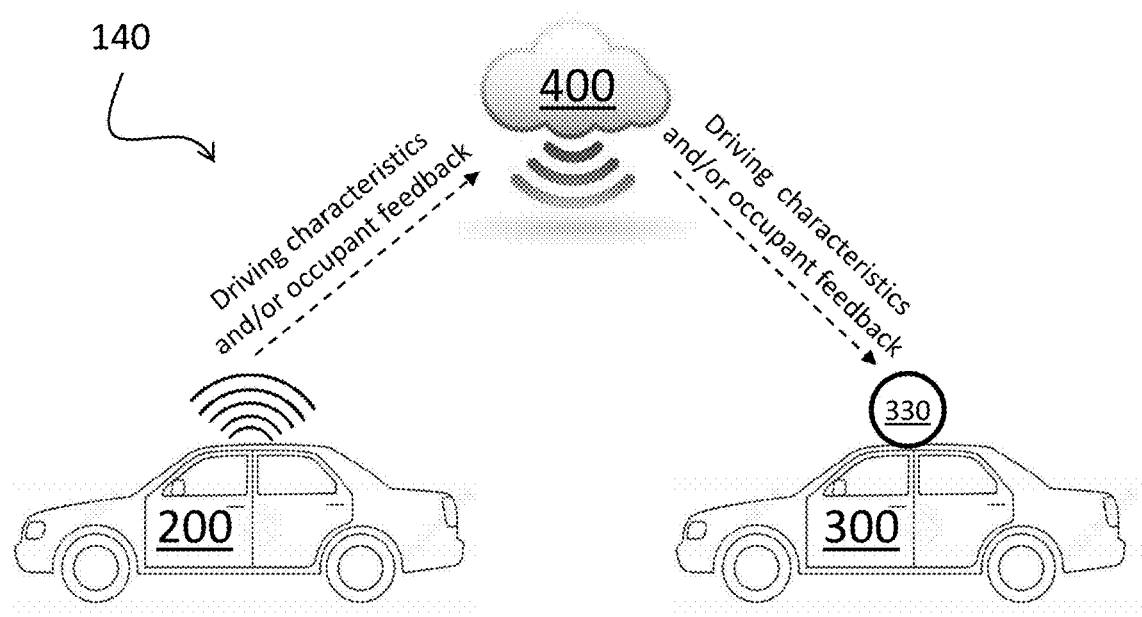

FIGS. 4C and 4D schematically illustrate embodiments 130 and 140, respectively, in which the evaluation of driving characteristics information may occur offboard vehicle 200. In particular, FIGS. 3C and 3D illustrate embodiments in which evaluation is performed onboard nearby piloted or autonomous vehicle 300. In one such embodiment, system 100 may further include a processor 330 configured to execute instructions stored on a memory 340 (also located onboard vehicle 300, in an embodiment) for evaluating driving characteristics transmitted from autonomous vehicle 200 (e.g., via transmitter 250). In embodiment 130, for example, driving characteristics and/or feedback provided by occupant(s) 210 may be sent directly to nearby piloted or autonomous vehicle 300 as shown in FIG. 3C, whereas in embodiment 140, driving characteristics and/or feedback from occupant(s) 210 may be sent indirectly to nearby piloted or autonomous vehicle 300 via remote server 400 as shown in FIG. 3D. In the latter embodiment 140, remote server 400 may immediately relay the driving characteristics and/or feedback from occupant(s) 210 to nearby piloted or autonomous vehicle 300 or instead store the driving characteristics and/or feedback from occupant(s) 210 from the current and/or past trips. Remote server 400 may then transmit current and/or historical driving characteristics and/or historical feedback from occupant(s) 210 to nearby piloted or autonomous vehicle 300 when requested by vehicle 300 or when directed to do so by vehicle 200.

It should be appreciated that embodiments in which driving characteristics are evaluated onboard nearby piloted or autonomous vehicle 300 may have certain benefits. In many cases, occupants 310 of vehicle 300 may prefer that their own vehicle (i.e., vehicle 300) evaluate driving characteristics and/or occupant feedback associated with autonomous vehicle 200 rather than a third-party processor (e.g., processor 230 of autonomous vehicle 200 or processor 430 of remote server 400, later described). In this way, occupants 310 may be more confident that the evaluation, for example, was performed to produce the most useful data possible for enhancing their specific driving experience preferences as opposed to receiving, for example, a one-size-fits-all characterization of driving style from a third-party (e.g., autonomous vehicle 200 or remote server 400). Further, with reference to embodiment 140 in particular, it may be beneficial to transmit driving characteristics and/or occupant feedback from autonomous vehicle 200 for storage on remote server 400 for reasons similar to those associated with transmitting driving style information for storage on remote server 400. In one aspect, this may allow remote server 400 to offload storage responsibility from autonomous vehicle 200, thereby reducing the amount of memory (e.g., memory 240) required on autonomous vehicle 200 for storing driving characteristics and/or occupant feedback. In another aspect, by storing driving characteristics and/or occupant feedback on remote server 400, nearly piloted or autonomous vehicle 300 may access driving style information from remote server 400 without needing to establish a communications link with autonomous vehicle 200. First, this may improve security as it may be easier to implement robust security protocols and monitoring on communications between vehicles and remote server 400 than on vehicle-to-vehicle communications. Second, nearby piloted or autonomous vehicle 300 may be able to access driving characteristics stored in remote server 400 for at least past trips of autonomous vehicle 200 in the event autonomous vehicle 200 is unable to or otherwise does not establish communications links with remote server 400 or nearby piloted or autonomous vehicle 300 during the current trip. One of ordinary skill in the art may recognize further benefits to this architecture within the scope of present disclosure.

Figure 4E:
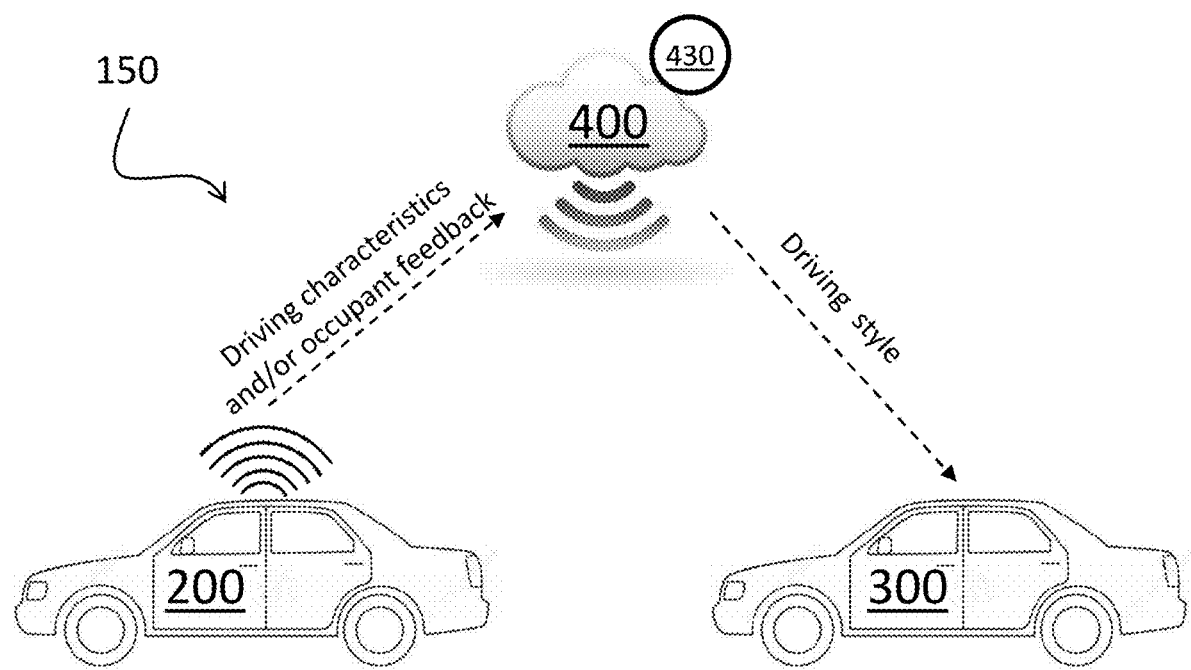
FIG. 4E schematically illustrates an embodiments of the system in which evaluation of driving characteristics occurs at a remote server, according to an embodiment of the present disclosure.

FIG. 4E schematically illustrates another embodiment 150 in which the evaluation of driving characteristics and/or occupant feedback may occur offboard autonomous vehicle 200. In particular, FIG. 4E illustrates an embodiment in which the evaluation is performed at remote server 400. In one such embodiment, system 100 may further include a processor 430 configured to execute instructions stored on a memory 440 (also located offboard autonomous vehicle 200 and at or in communication with remote server 400, in an embodiment) for evaluating driving characteristics transmitted from autonomous vehicle 200 (e.g., via transmitter 250). In embodiment 150, for example, driving characteristics and/or occupant feedback may be sent directly to remote server 400 for evaluation at remote server 400 as shown in FIG. 4E. Remote server 400 may then transmit current and/or historical driving style information to nearby piloted or autonomous vehicle 300 when requested by nearby piloted or autonomous vehicle 300 or when directed to do so by autonomous vehicle 200.

It should be appreciated that embodiments in which driving characteristics and/or occupant feedback are evaluated at remote server 400 may have certain benefits. In many cases, one such benefit may be that transmitting driving style information may require less bandwidth than transmitting raw or pre-processed driving characteristics information and/or occupant feedback, as in many cases driving style information may represent a more distilled version of driving characteristics information and/or occupant feedback. While this particular benefit may be limited to communicating driving style from remote server 400 and nearby piloted or autonomous vehicle 300, as opposed to additionally benefiting communications from autonomous vehicle 200 to either nearby piloted or autonomous vehicle 300 or remote server 400 as in embodiments 110 and 120, respectively, the benefit exists nonetheless.

Further, occupants 310 of vehicle 300 may prefer that remote server 400, and not autonomous vehicle 200, evaluate driving characteristics and/or occupant feedback associated with autonomous vehicle 200. In this way, occupant(s) 310 may be more confident that the evaluation, for example, was performed by a more trusted source (e.g., remote server 400). In an embodiment, remote server 400 could even be programmed to first request driving experience preferences from nearby piloted or autonomous vehicle 300 (or allow them to be pre-set in remote server 400) such that remote server 400 can then evaluate the driving characteristics and/or occupant feedback in a manner that produces the most useful data possible for enhancing the specific driving experience preferences of occupant(s) 310 of nearby piloted or autonomous vehicle 300.

Still further, it may be beneficial to transmit driving characteristics and/or occupant feedback from autonomous vehicle 200 for storage on remote server 400 for reasons similar to those described with reference to embodiment 140. This may allow remote server 400 to offload storage responsibility from autonomous vehicle 200, thereby reducing the amount of memory (e.g., memory 240) required on autonomous vehicle 200 for storing driving characteristics and/or occupant feedback.

Further benefits may exist similar to those described with respect to embodiment 120 in terms of storing driving style on remote server 400. In particular, as configured, nearby piloted or autonomous vehicle 300 may access driving style information from remote server 400 without needing to establish a communications link with autonomous vehicle 200. First, this may improve security as it may be easier to implement robust security protocols and monitoring on communications between vehicles and remote server 400 than on vehicle-to-vehicle communications. Second, nearby piloted or autonomous vehicle 300 may be able to access driving style information stored in remote server 400 for at least past trips of autonomous vehicle 200 in the event autonomous vehicle 200 is unable to or otherwise does not establish communications links with remote server 400 or nearby piloted or autonomous vehicle 300 during the current trip.

Yet further benefits may be derived from evaluating the driving characteristics and/or occupant feedback at remote server 400. In one aspect, embodiment 150 may leverage enhanced computational power and storage capabilities at remote server 400 as opposed to perhaps more limited computational and storage capabilities on mobile platforms associated with vehicles 200, 300. In another aspect, performing evaluations at a central location can ensure consistent approaches are used across system for characterizing driving style. Still further, in another aspect, performing evaluations at a central location may allow for embodiment 150 to leverage big data analytics techniques for constantly improving evaluation techniques. In particular, the multitude of evaluations performed at remote server 400 could be analyzed, perhaps along with feedback from nearby piloted or autonomous vehicles 300 and/or occupants 310 across the system, to figure out what works best and what does not work as well based on actual empirical data and thereby improve evaluation techniques. In yet another aspect, remote server 400 may be configured to store driving characteristics and/or occupant feedback associated with various autonomous vehicles 200 and apply the constantly improving evaluation methods over time. One of ordinary skill in the art may recognize further benefits to this architecture within the scope of present disclosure.

Various transmissions of driving characteristics, occupant feedback, and/or driving style information amongst the various combinations of autonomous vehicle 200, nearby piloted or autonomous vehicle 300, and remote server 400 of system 100 may be initiated in accordance with any suitable requests, commands, and the like from any suitable source within system 100. For example, with reference to embodiments 110 and 130 (i.e., local transmission amongst vehicles 200, 300), nearby piloted or autonomous vehicle 300 may detect the presence of autonomous vehicle 200 and send a request to autonomous vehicle 200 for the driving characteristics, occupant feedback, and/or driving style information. Similarly, autonomous vehicle 200 may instead detect the presence of nearby piloted or autonomous vehicle 300 and push its driving characteristics, occupant feedback, and/or driving style information to nearby piloted or autonomous vehicle 300. In another example, nearby piloted or autonomous vehicle 300 may detect the presence of autonomous vehicle 200 and send a request to remote server 400 for the driving characteristics, occupant feedback, and/or driving style information for autonomous vehicle 200. In one such embodiment, nearby piloted or autonomous vehicle 300 may identify autonomous vehicle 200 based on an identification beacon emitted by autonomous vehicle 200, wherein the beacon contains information suitable for accessing corresponding driving characteristics, occupant feedback, and/or driving style information from remote server 400. In another such embodiment, nearby piloted or autonomous vehicle 300 may capture an image of autonomous vehicle's 200 license plate or other visual identifier (e.g., a barcode sticker affixed to autonomous vehicle 200) and transmit the image or identifier to remote server 400 for identification.

Figure 5:
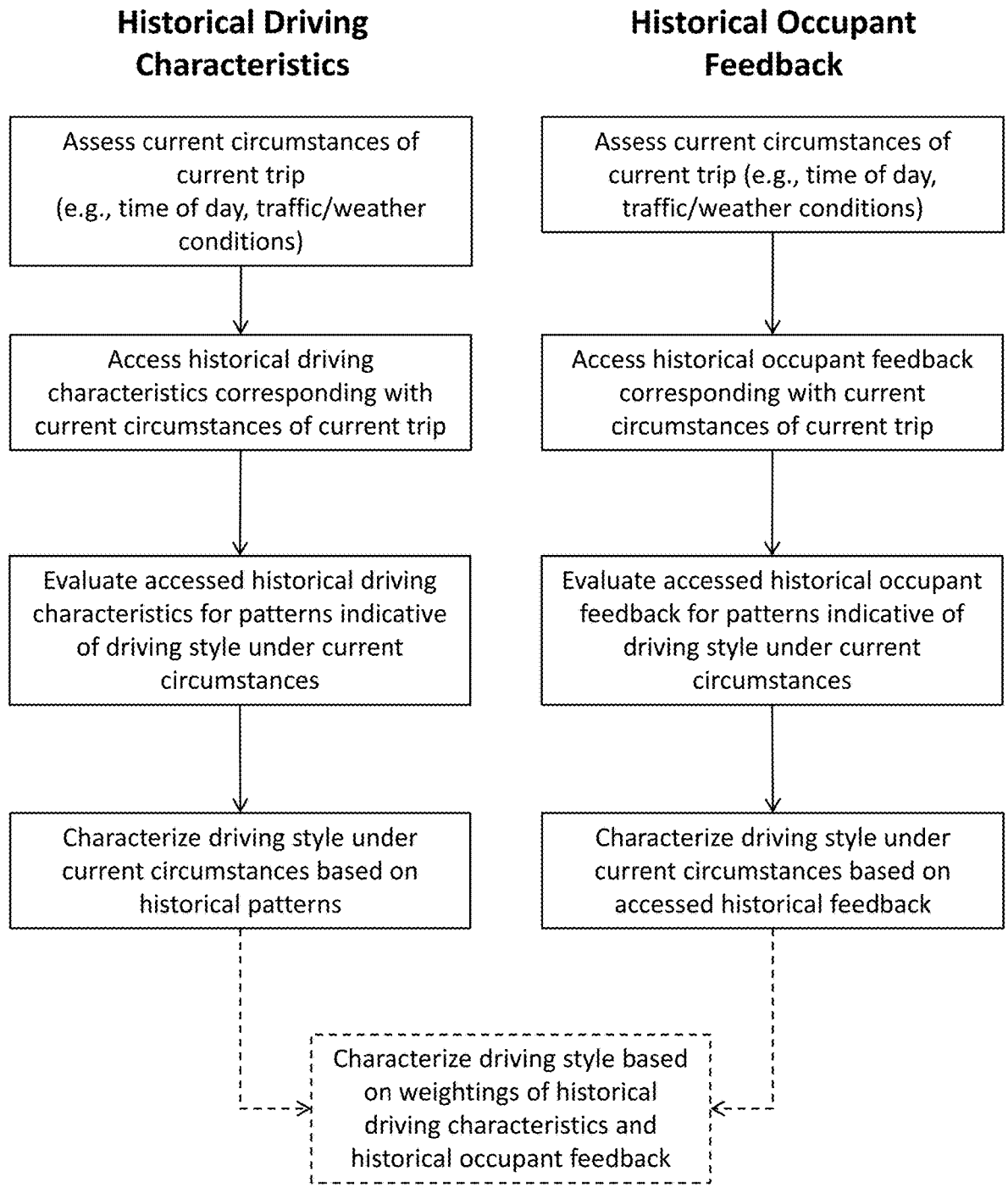
FIG. 5 is a flow chart illustrating a representative approach for automatically characterizing the driving style of an autonomous vehicle based on corresponding driving characteristics and or corresponding occupant feedback, according to an embodiment of the present disclosure.

Characterizing Driving Style Based on Driving Characteristics and/or Occupant Feedback FIG. 5 is a flow chart illustrating a representative approach for automatically characterizing the driving style of autonomous vehicle 200 based on corresponding driving characteristics and/or occupant feedback collected from autonomous vehicle 200. In various embodiments, characterizing driving style may generally include evaluating the driving characteristics collected by sensor(s) 220 and/or evaluating feedback provided by occupant(s) 210 to identify patterns and other indicators suitable for characterizing the driving style of autonomous vehicle 200, as further described in more detail below. In various embodiments, processor 130 may be configured to perform the steps of evaluating and characterizing, whether processor 130 is located onboard or offboard autonomous vehicle 200 depending on the particular embodiment.

Referring first to the left side of FIG. 5, the process, in various embodiments, may include characterizing driving style based at least in part on patterns and other relevant information derived from driving characteristics associated with vehicle 200 from previous trips. In particular, the process may utilize historical driving characteristics associated with portions of previous trips conducted under circumstances similar to those of the current trip. As configured, the driving style information derived under the process may be more representative of the particular driving style likely to be exhibited under the present circumstances.

Accordingly, in a representative embodiment, the process may begin by assessing various circumstances of the current trip that may have an effect on the particular driving style likely to be exhibited by autonomous vehicle 200 during the current trip. Many factors may affect driving style at any given time, such as driving experience preferences designated by occupant(s) 210, severity of traffic, weather conditions, time of day, where the trip occurs (e.g., urban vs. rural environment, highway vs. smaller road, etc.), and the duration of the trip, amongst other relevant factors. One of ordinary skill in the art will recognize further circumstances that may have an effect on the particular driving style likely to be exhibited by autonomous vehicle 200 during the current trip within the scope of the present disclosure.

Next, the process, in various embodiments, may include accessing (e.g., from memory 240, memory 340, or remote server 400, depending on the embodiment) driving characteristics collected for autonomous vehicle 200 during all or portions of previous trips conducted under the same or similar circumstances. As previously noted, the accessed historical driving characteristics are likely to be representative of those associated with the current trip due to the similarities of circumstances between the current trip and the particular previous trips whose information was accessed.

The process may continue, in various embodiments, by evaluating the accessed historical driving characteristics for patterns and other relevant information that may be indicative of autonomous vehicle's 200 driving style under the current circumstances of the current trip. The process may evaluate driving characteristics associated with those past trips under similar circumstances, and attempt to identify associated trends. Those historical trends, which are associated with past trips taken under similar circumstances, can then be used to estimate current driving style.

Driving style, in various embodiments, can be characterized at a macro-scale (e.g., overall aggressive, erratic, average, indecisive, passive), while in other embodiments, driving style may additionally or alternatively be broken down into various categories of interest (e.g., tendencies to speed or creep, tendencies to brake hard, tendencies to follow at unsafe distances) and each characterized on a scale, such as a scale of 1-10.

Driving style, in various embodiments, can be characterized at a macro-scale (e.g., overall aggressive, erratic, average, indecisive, passive), while in other embodiments, driving style may additionally or alternatively be broken down into various categories of interest (e.g., those shown in FIG. 3).

In various embodiments, system 100 may consider averages, medians, or any other mathematical distillation of driving characteristics in characterizing driving style. For example, driving characteristics for a given historical trip may be evaluated and assigned a rating, such as a rating on a scale of 1-10, and system 100 may evaluate those ratings associated with the accessed historical trips for patterns and other relevant information. System 100 may then characterize driving style based on those patterns and relevant derivations. For example, system 100 may be configured to consider an average or median of such ratings for a given driving characteristic or combination of driving characteristics, and characterize an aspect of driving style based on the average or median rating. Likewise, in an embodiment, system 100 may perform a similar process based on the driving characteristics themselves, independent of assigned ratings. For example, system 100 may consider a given driving characteristic (e.g., following distance) measured during the accessed previous trips and consider an average or median thereof in characterizing an associated aspect of driving style or overall driving style.

In various embodiments, system 100 may consider trends in the driving characteristics in characterizing driving style. For example, the process may weigh ratings from more recent trips higher than ratings from trips further in the past. Such an approach may better account for changes or improvements to the control algorithms used to control autonomous vehicle 200 over time. One of ordinary skill in the art will recognize further approaches for characterizing driving style based on patterns and other relevant information derived from historical driving characteristics within the scope of the present disclosure.

Referring now to the right side of FIG. 5, the process, in various embodiments, may additionally or alternatively include characterizing driving style based at least in part on patterns and other relevant information derived from feedback provided by occupants 210 of vehicle 200 during previous trips. In particular, the process may utilize historical occupant feedback associated with portions of previous trips conducted under circumstances similar to those of the current trip. As configured, the driving style information derived under the process may be more representative of the particular driving style likely to be exhibited under the present circumstances.

Accordingly, in a representative embodiment, the process may begin by assessing various circumstances of the current trip that may have an effect on the particular driving style likely to be exhibited by autonomous vehicle 200 during the current trip. Many factors may affect driving style at any given time, such as driving experience preferences designated by occupant(s) 210, severity of traffic, weather conditions, time of day, where the trip occurs (e.g., urban vs. rural environment, highway vs. smaller road, etc.), and the duration of the trip, amongst other relevant factors. One of ordinary skill in the art will recognize further circumstances that may have an effect on the particular driving style likely to be exhibited by autonomous vehicle 200 during the current trip within the scope of the present disclosure.

Next, the process, in various embodiments, may include accessing (e.g., from memory 240, memory 340, or remote server 400, depending on the embodiment) corresponding feedback provided by occupants 210 of autonomous vehicle 200 during all or portions of previous trips conducted under the same or similar circumstances. As previously noted, the accessed historical occupant feedback is likely to be representative of feedback that may be provided concerning how autonomous vehicle 200 operates during the current trip due to the similarities of circumstances between the current trip and the particular previous trips whose feedback is being accessed.

The process may continue, in various embodiments, by evaluating the accessed historical occupant feedback for patterns and other relevant information that may be indicative of autonomous vehicle's 200 driving style under the current circumstances of the current trip. The process may evaluate occupant feedback associated with those past trips under similar circumstances, and attempt to identify associated trends. Those historical trends, which are associated with past trips taken under similar circumstances, can then be used to estimate current driving style.

Driving style, in various embodiments, can be characterized at a macro-scale (e.g., overall aggressive, erratic, average, indecisive, passive), while in other embodiments, driving style may additionally or alternatively be broken down into various categories of interest (e.g., those shown in FIG. 3).

In various embodiments, system 100 may consider averages, medians, or any other mathematical distillation of occupant feedback in characterizing driving style. For example, occupant(s) 210 may provide ratings (e.g., scale of 1-10) for various driving characteristics of a given historical trip as previously described, and system 100 may evaluate those ratings for patterns and other relevant information. System 100 may then characterize driving style based on those patterns and relevant derivations. For example, system 100 may be configured to consider an average or median of such ratings for a given driving characteristic or combination of driving characteristics, and characterize an aspect of driving style based on the average or median rating.

In various embodiments, system 100 may consider trends in the occupant feedback in characterizing driving style. For example, the process may weigh ratings from more recent trips higher than ratings from trips further in the past. Such an approach may better account for changes or improvements to the control algorithms used to control autonomous vehicle 200 over time. One of ordinary skill in the art will recognize further approaches for characterizing driving style based on patterns and other relevant information derived from historical occupant feedback within the scope of the present disclosure.

Referring now to the bottom of FIG. 5, system 100, in various embodiments, may be configured to consider both historical driving characteristics and historical occupant feedback in characterizing driving style. In particular, in a representative embodiment, system 100 may be configured to independently characterize driving style based on historical driving characteristics and on historical occupant feedback, and then form an overall characterization based on a combination of the two independent characterizations. In an embodiment, system 100 may characterize overall driving style or a particular aspect thereof based on a straight average (not shown) of the two characterizations. In another embodiment, system 100 may instead characterize overall driving style or a particular aspect thereof based on a weighted average (shown) of the two characterizations. One of ordinary skill in the art will recognize further approaches for forming a combined characterization of overall driving style or an aspect thereof based on independent driving style characterizations based on historical driving characteristics and historical occupant feedback within the scope of the present disclosure. It should be appreciated that, while not shown, system 100 may likewise characterize driving style based on independent evaluations of historical driving characteristics and historical occupant feedback without first independently characterizing each. Stated otherwise, each could be evaluated as described above, and the resulting combination of patterns and other relevant information considered together in characterizing driving style.

System 100 may optimize the amount of information being processed and shared amongst the components of the system to achieve a desired balance of transmission speed (i.e., more info, slower transmission) and information fidelity (i.e., more information, better intelligence). Further, system 100 may be configured to allow individual users to apply settings and permissions for what information they see and how it is presented, thereby enhancing human factors. Still further, such a configuration may similarly allow occupants 210 to control what information is transmitted to nearby piloted or autonomous vehicles 300 or remote server 400, thereby provide a level of control of data sharing privacy.

Automatic Warnings and Adjustments Based on Driving Style

Figure 6:
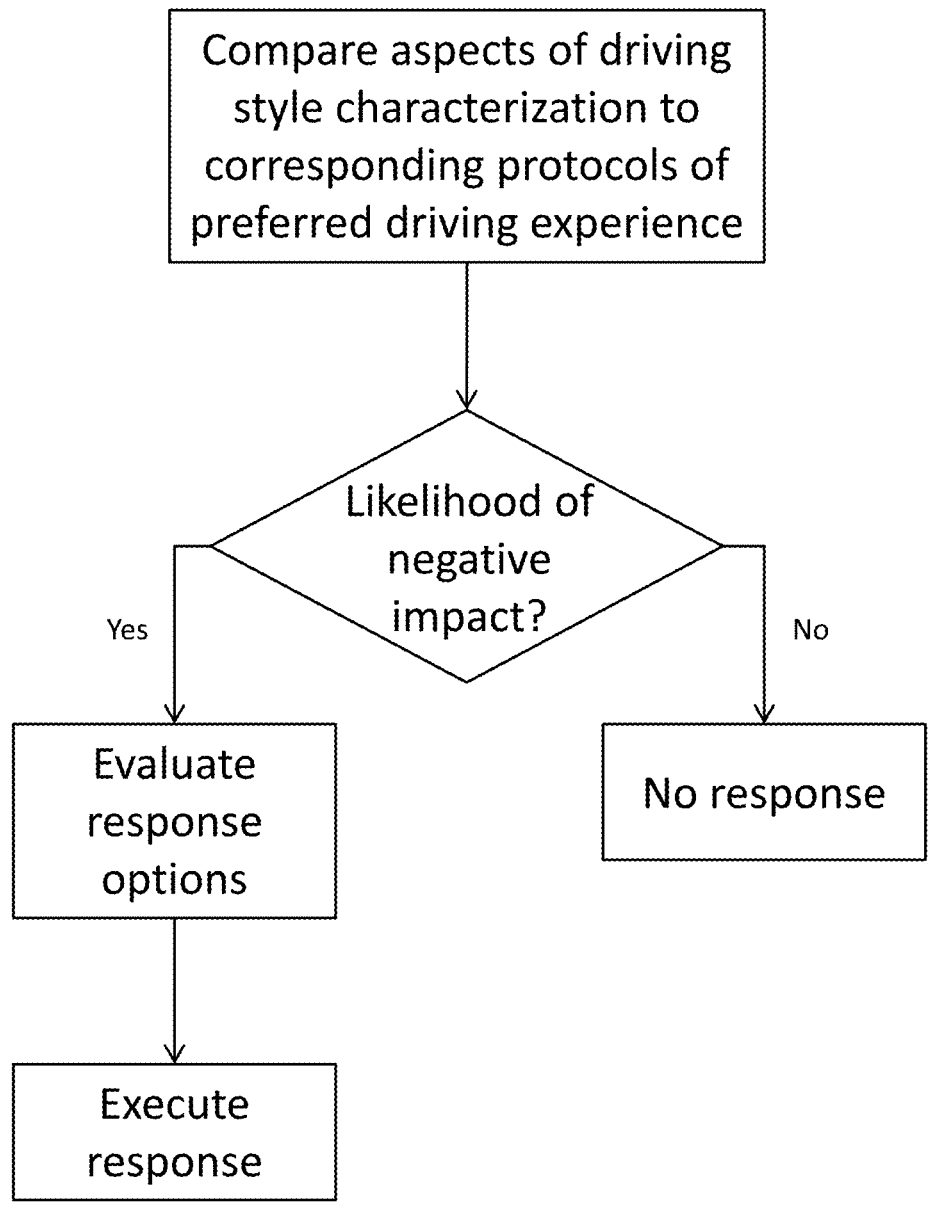
FIG. 6 is a flow chart illustrating a representative approach for generating automatic responses in nearby vehicles based on information concerning the driving style of the driver.

FIG. 6 is a flow chart illustrating a representative approach for generating automatic responses in nearby piloted or autonomous vehicles 300 based on information concerning the driving style of autonomous vehicle 210. In particular, in various embodiments, system 100 may be configured to automatically warn occupant(s) 310 of nearby piloted or autonomous vehicles 300 when the driving style of autonomous vehicle 200 is likely to or may otherwise degrade the preferred driving experience of occupant(s) 310.

Additionally or alternatively, system 100 may be configured to automatically adjust the operation of nearby autonomous vehicles 300 when the driving style of autonomous vehicle 200 is likely to or may otherwise degrade the preferred driving experience of occupant(s) 310.

The process, in various embodiments, may begin by comparing the driving style of autonomous vehicle 200 with corresponding aspects of the preferred driving experience of occupant(s) 310. As previously described, driving experience may be characterized by a number of factors including, for example, preferences concerning trip duration, efficiency of power or fuel consumption, and tolerance levels for safety risks. Many aspects of driving style can be associated with and assigned a likelihood of affecting each of the factors characterizing driving experience. For example, autonomous vehicle's 200 tendency to speed, follow at unsafe distances, and change lanes unsafely may have a high likelihood of negatively impacting a safety- and comfort-focused driving experience preferred by occupant(s) 310 of nearby piloted or autonomous vehicle 300. Likewise, autonomous vehicle's 200 tendency to accelerate and brake quickly may have a high likelihood of negatively impacting the preferred driving experience of green-minded occupant(s) 310 that value efficient fuel consumption in nearby piloted or autonomous vehicle 300, as vehicle 300 may otherwise unnecessarily speed up and slow down frequently when following autonomous vehicle 200 in traffic. As configured, system 100 may compare driving style and driving experience to identify whether and how likely autonomous vehicle's 200 driving style may negatively impact occupant(s)'s 310 preferred driving experience.

Figure 7A:
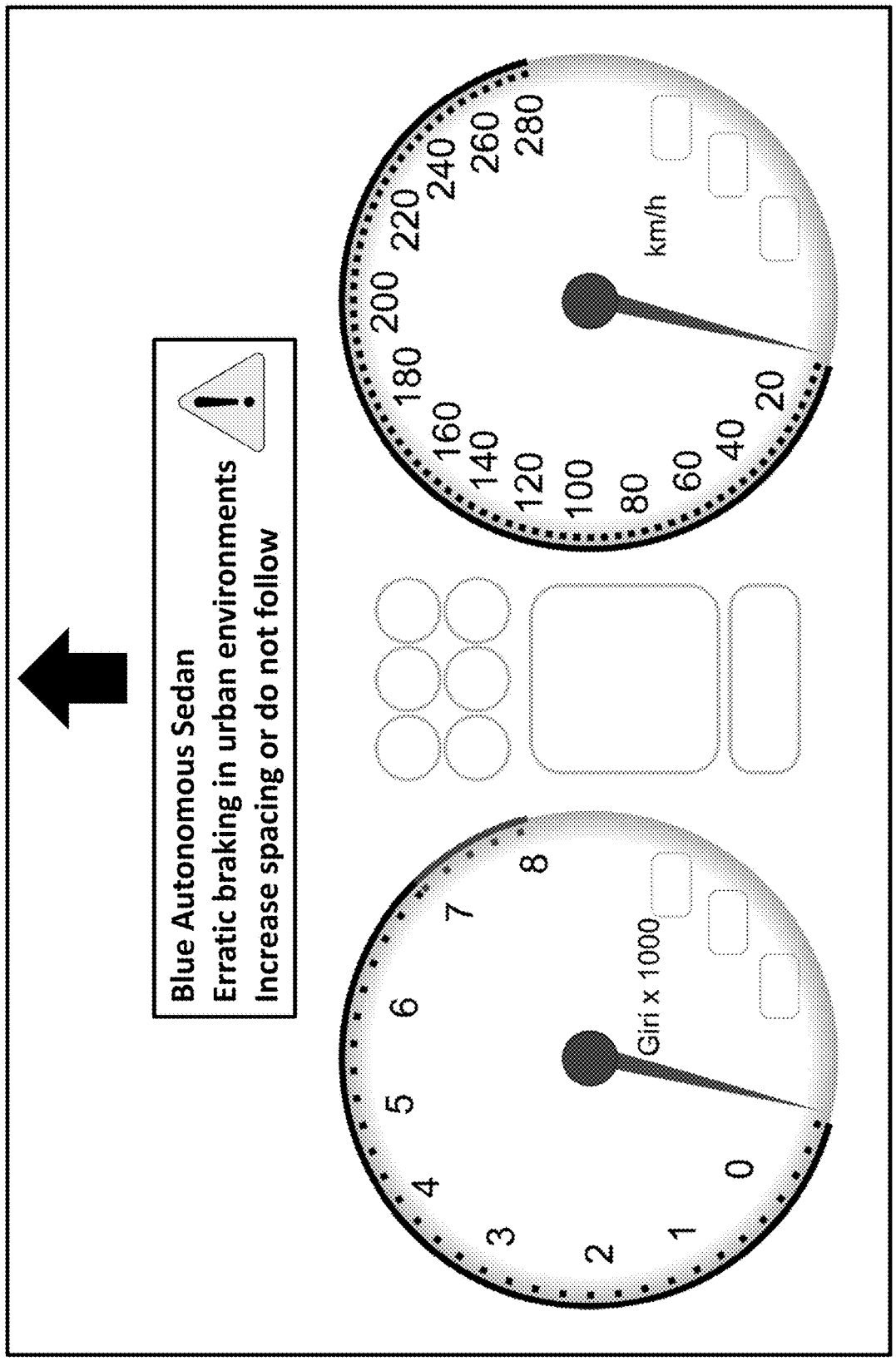
FIGS. 7A and 7B depict representative warnings generated for consideration by a driver of a nearby vehicle, according to an embodiment of the present disclosure.
Figure 7B:
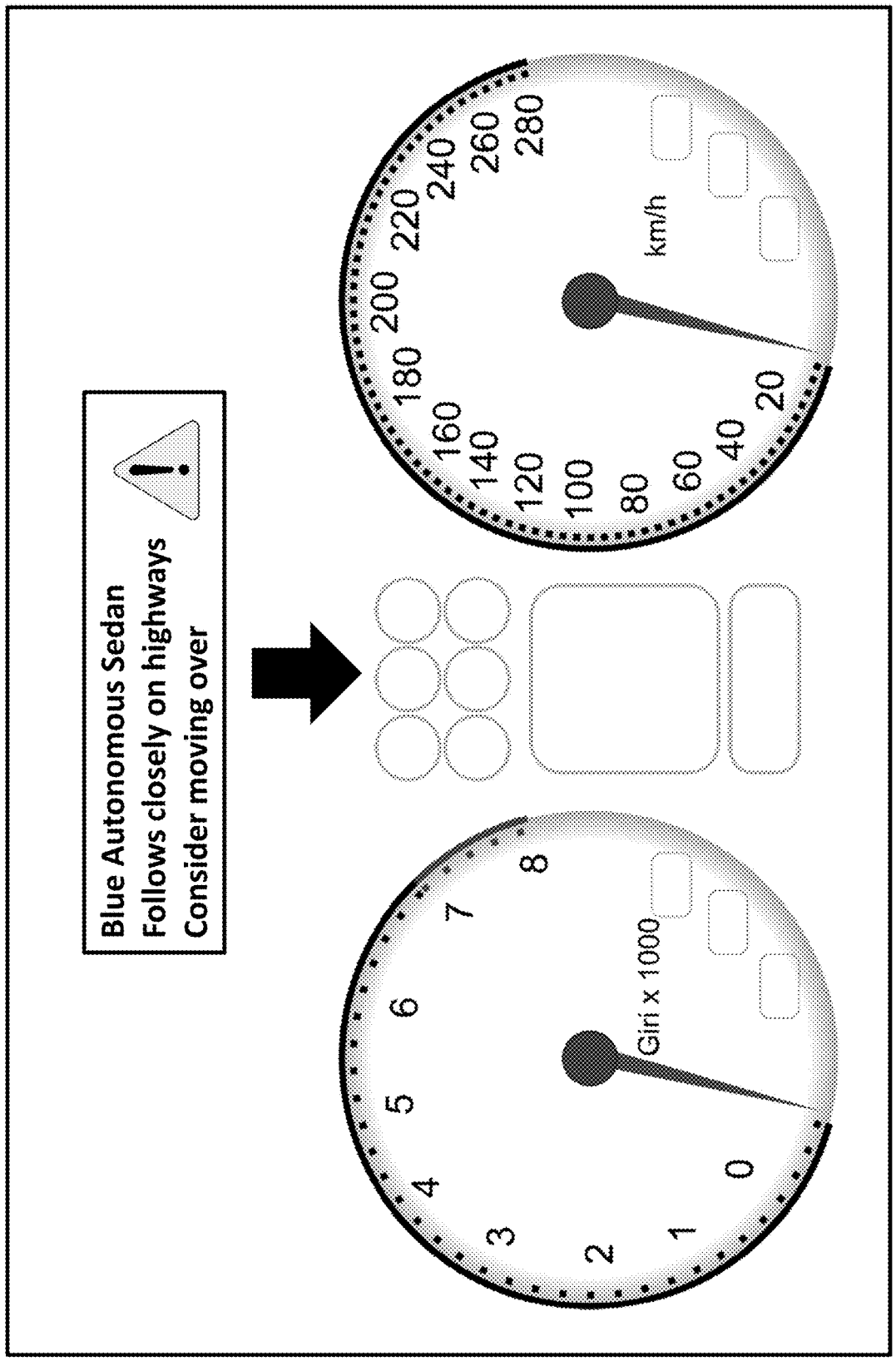

In the event system 100 determines that the driving style of autonomous vehicle 200 is likely to negatively affect the preferred driving experience of occupant(s) 310, system 100 may be configured to, in response, evaluate potential options for enhancing the preferred driving experience. Referring to FIG. 7A and FIG. 7B, in embodiments in which nearby piloted or autonomous vehicle 300 is a piloted vehicle, system 100 may be configured to evaluate response options in the form of generating warnings for consideration by the driver 310 of nearby piloted vehicle 300. Warnings may be in any form suitable for notifying the driver 310 of piloted vehicle 300 about aspects of the driving style of autonomous vehicle 200 that may negatively affect the preferred driving experience of the driver 310 of piloted vehicle 300. For example, warnings may be visual, audible, tactile, or any combination thereof.

In the example shown in FIG. 7A, a visual warning is presented to the driver 310 of piloted vehicle 300 notifying the driver 310 that blue autonomous sedan 200 has a driving style characterized by erratic braking in urban environments and suggests either increasing spacing between the vehicles 200, 300 or simply not following autonomous vehicle 200 in response. An arrow points ahead in the direction of autonomous vehicle 200 in this example to facilitate the driver 310 of vehicle 300 in identifying the autonomous vehicle 200 in question with minimal distraction.

In the example shown in FIG. 7B, a visual warning is presented to the driver 310 of piloted vehicle 300 notifying the driver 310 that blue autonomous sedan 200 has a driving style characterized by following too closely on highways and suggests moving over in response. Like in the example of FIG. 7A, the warning presented to driver 310 in the example of FIG. 7B includes an arrow for facilitating driver 310 in identifying the autonomous vehicle 200 in question; however, the arrow points behind as autonomous vehicle 200 is following vehicle 300 in this example.

By presenting the driver 310 of nearby piloted vehicle 300 with these or similar warnings, the driver 310 may consider taking action to enhance his/her preferred driving experience.

Figure 8:
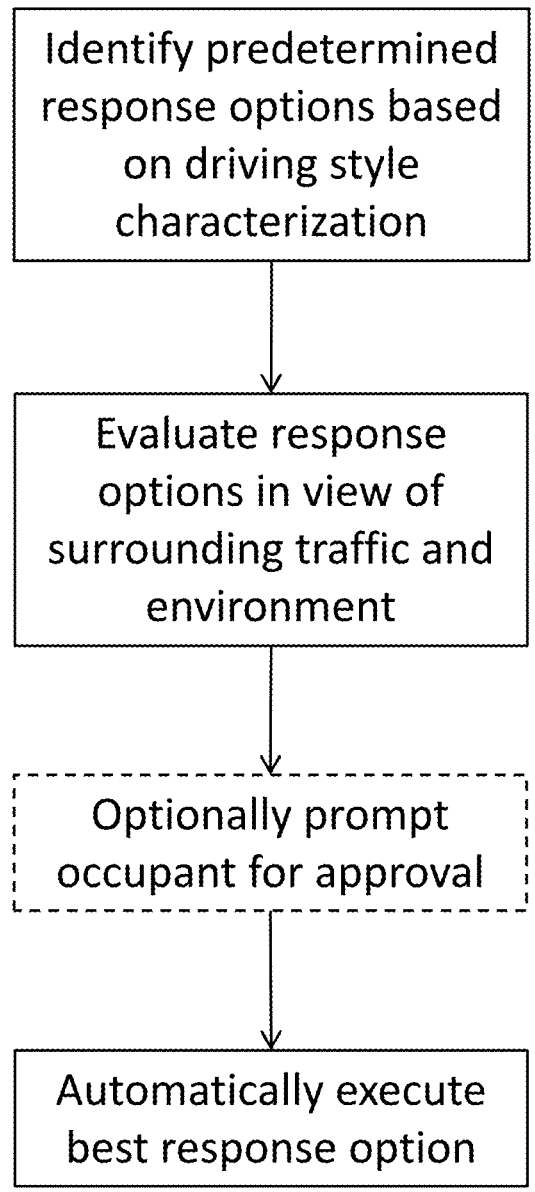
FIG. 8 is a flow chart illustrating a representative approach for evaluating response options in the form of warnings to occupants of nearby vehicles and/or automatic adjustments in the operation of nearby autonomous vehicles, according to an embodiment of the present disclosure.

Referring to FIG. 8, in embodiments in which nearby piloted or autonomous vehicle 300 is an autonomous vehicle, system 100 may be configured to evaluate response options in the form of automatic adjustments in the operation of nearby piloted or autonomous vehicle 300. Automatic adjustments to the operation of vehicle 300 may include, without limitation, controls adjustments for changing lanes, slowing down, or passing. In various embodiments, system 100 may identify one or more predetermined response options from a database. The database, in an embodiment, may store and associate a variety of response options with a variety of situations, each situation being characterized at least in part by a combination of preferred driving experience and driving style. For example, for a situation characterized by an aggressive autonomous vehicle 200 pulling in front of a safety-minded occupant(s) 310, the database may present suitable response options such as slow down (i.e., increase spacing) or change lanes so that occupant(s) 310 is no longer following directly behind aggressive autonomous vehicle 200. The database may be stored locally on autonomous vehicle 300 or remotely such as on remote server 400.

System 100, in various embodiments, may be configured to then evaluate suitable response options for the given combination of driving style and driving experience in view of the surrounding traffic and environment to determine which identified response option(s) can be safely and/or expeditiously executed. It should be recognized that autonomous vehicles utilize a variety of sensors for understanding the surrounding environment, and that these sensors may be leveraged for this purpose according to approaches known in the art.

Upon determining one or more options for adjusting the current operation of vehicle 300 in response to the presence of autonomous vehicle 200, system 100 in an embodiment may automatically select and execute a suitable option. The process, in various embodiments, may optionally include first requesting input from occupant(s) 310 as to whether they would like system 100 to automatically implement controls adjustments in response to the presence of vehicle 200. For example, system 100 may be configured to visually and/or audibly alert occupant(s) 310 to the presence and driving style of driver 210, present one or more options for automatically adjusting the operation of vehicle 300, and asking occupant(s) 310 which option it prefers (including, in some cases, taking no action). As configured, occupant(s) 310 may feel more comfortable or in control.

As with processing driving characteristics information, processing associated with determining and executing automatic responses to driving style information may occur locally at piloted or autonomous vehicle 300 or remotely, such as in remote server 400. In the latter case, response options in an embodiment may be sent to piloted or autonomous vehicle 300 for further evaluation in view of surrounding traffic and environment to minimize the dangers potentially posed by lag associated with performing this step remotely rather than locally at piloted or autonomous vehicle 300.

It should be appreciated that, in some cases, it may be beneficial to utilize a central database of response options when identifying suitable response options. In various embodiments, system 100 may leverage large amounts of empirical data to optimize such a central database. For example, system 100 may process feedback from a plurality of vehicles 300 regarding how often each option is chosen in each situation, as well as feedback occupant(s) 310 regarding whether they believe that response option worked out well in practical reality, to assess the suitability of each option and suggest preferred response options to vehicles 300. In some embodiments, artificial intelligence may be utilized to perform even more robust optimization continuously, thereby improving the decision-making abilities of system 100.

Figures 9A, 9B:
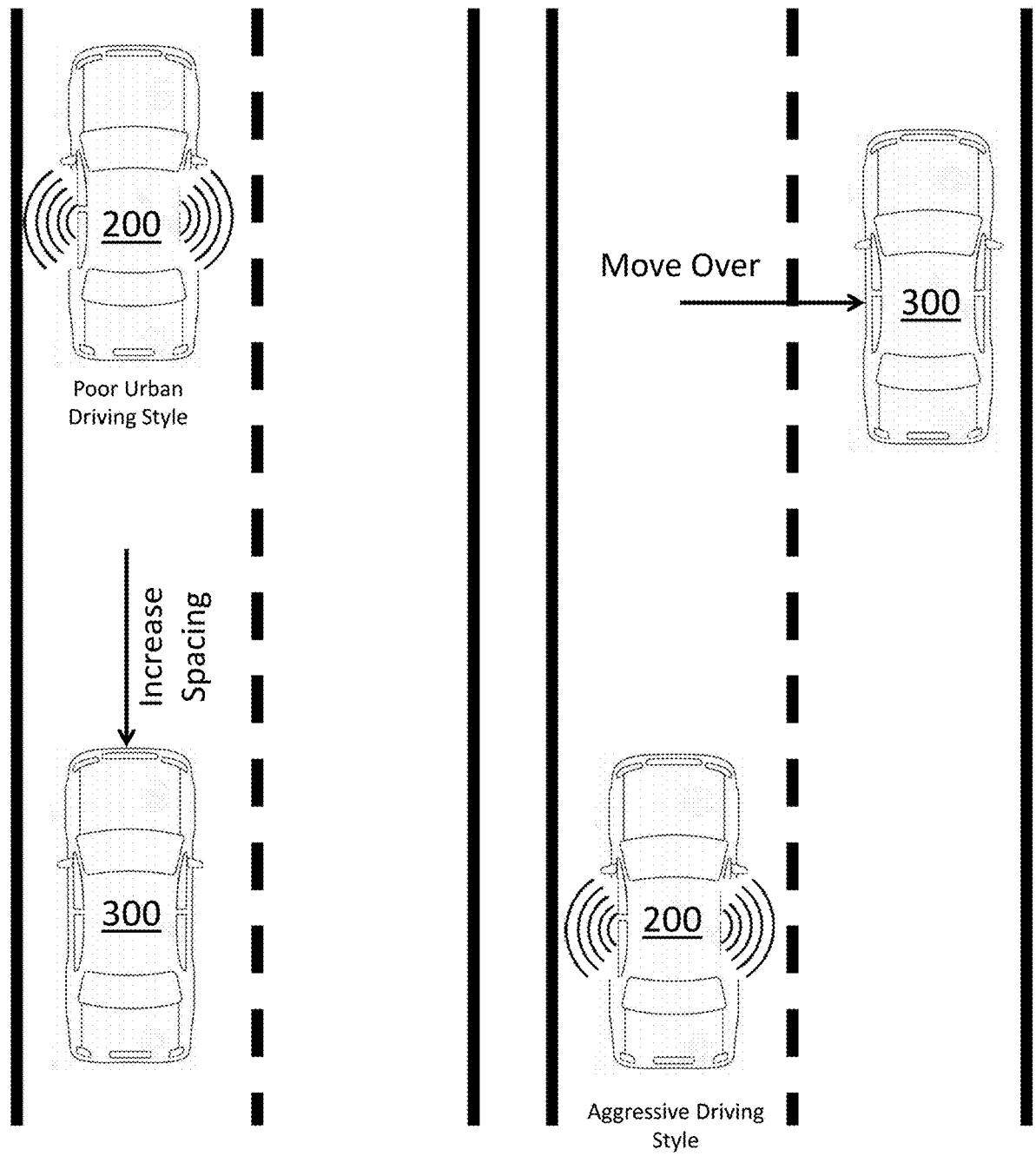
FIGS. 9A-9D illustrate representative examples of how the present systems and methods may be utilized for enhancing the driving experience of occupant(s) of piloted vehicles and autonomous vehicles, in accordance with various embodiments of the present disclosure.
Figures 9C, 9D:
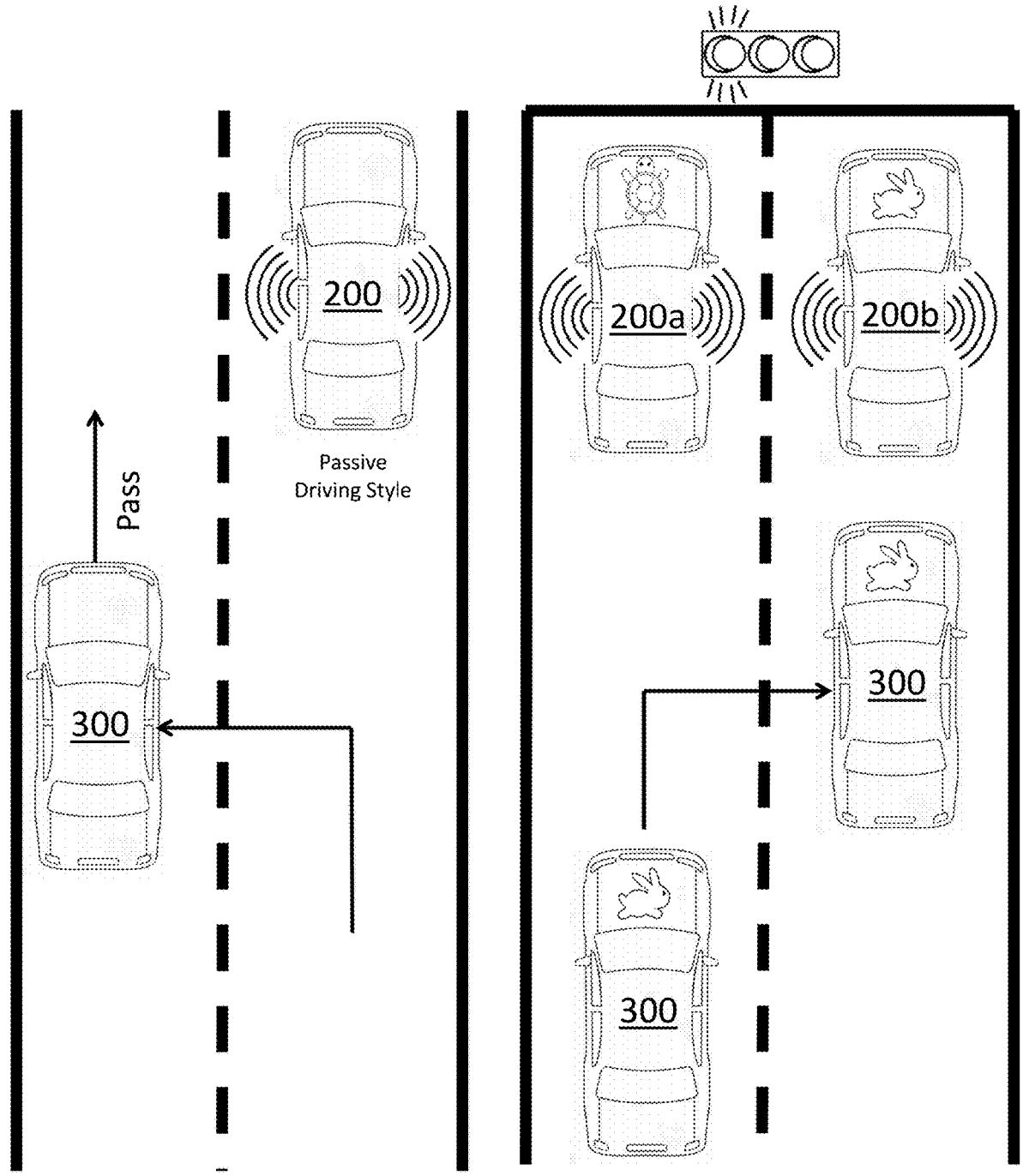

FIGS. 9A-9D illustrate representative examples of how the present systems and methods may be utilized for enhancing the driving experience of occupant(s) of piloted vehicles and autonomous vehicles 300. Referring first to FIGS. 9A and 9C, consider that autonomous vehicle 200 has a poorly-rated driving style in urban environments (e.g., erratic braking, timidity, etc.) and that occupant(s) 310 of nearby vehicle 300 prefer a driving experience characterized by a high level of safety. Upon receiving driving style information concerning autonomous vehicle 200, the nearby piloted or autonomous vehicle 300 (more specifically, its occupant(s) 310 or autonomous control system) may take action in response to mitigate potential frustration and/or safety risks posed by the erratic braking and timidity of autonomous vehicle 200 in the urban environment. In the example of FIG. 9A, piloted or autonomous vehicle 300 is travelling behind autonomous vehicle 200 and may opt to further increase its spacing from autonomous vehicle 200 (beyond usual spacing distances), thereby giving piloted or autonomous vehicle 300 more time to take evasive action given the potentially higher risk posed by the poor urban driving style of autonomous vehicle 200. In the example of FIG. 9C, piloted or autonomous vehicle 300 is again travelling behind autonomous vehicle 200 and may opt to pass autonomous vehicle 200 in order to avoid the frustration and/or potential safety hazards of following autonomous vehicle 200 in the urban environment.

Referring next to FIG. 9B, consider that autonomous vehicle 200 has an aggressive driving and that occupant(s) 310 of nearby vehicle 300 prefer a driving experience characterized by a high level of safety. Autonomous vehicle 200 is approaching piloted or autonomous vehicle 300 from behind, and in light of the potentially higher risk posed by the historically aggressive driving style of autonomous vehicle 200, the driver or control system of vehicle 300 may opt to move over to the next lane so as to avoid being tailgated, thereby enhancing the driving experience of occupant(s) 310 in vehicle 300.

Referring now to FIG. 9D, autonomous vehicles 200*a*, 200*b* are stopped at a stoplight next to one another, and vehicle 200*a* historically creeps out of stoplights while vehicle 200*b* historically accelerates at a faster rate of out stoplights. In light of the potentially lower likelihood of becoming stuck at a low rate of speed behind vehicle 200*b*, piloted or autonomous vehicle 300 may opt to adjust its course to avoid pulling up behind vehicle 200*a* (e.g., move over behind vehicle 200*b*). This may enhance the driving experience of occupant(s) 310 who prefer a trip with a short duration.

While the presently disclosed embodiments have been described with reference to certain embodiments thereof, it should be understood by those skilled in the art that various changes may be made and equivalents may be substituted without departing from the true spirit and scope of the presently disclosed embodiments. In addition, many modifications may be made to adapt to a particular situation, indication, material and composition of matter, process step or steps, without departing from the spirit and scope of the present presently disclosed embodiments. All such modifications are intended to be within the scope of the claims appended hereto.

What is claimed is:

1. A system comprising:
   a display configured to display a user interface, wherein the user interface is configured to receive feedback from an occupant of an autonomous vehicle concerning driving characteristics associated with operation of the autonomous vehicle; and
   a processor configured to:
   determine a driving style of the autonomous vehicle is likely to degrade a preferred driving experience of an occupant in a nearby vehicle; and
   generate a warning communicable to the nearby vehicle.

2. The system of claim 1, wherein the display is integrated into the autonomous vehicle.

3. The system of claim 1, wherein the display is on a mobile device.

4. The system of claim 1, further comprising a sensor configured to collect information concerning driving characteristics associated with operation of the autonomous vehicle, wherein the information concerning driving characteristics includes identifiable metrics regarding how an autonomous control system operates the autonomous vehicle including one or a combination of vehicle speed, vehicle acceleration, vehicle location, braking force, braking deceleration, vehicle speed relative to speed limit, vehicle speed in construction zones, vehicle speed in school zones, lane departures, relative speed to a vehicle driving ahead, relative distance to a vehicle driving ahead, and relative acceleration to a vehicle driving ahead.

5. The system of claim 4, wherein the processor configured to characterize aspects of a driving style of the autonomous vehicle, including one or more patterns or tendencies derived from the collected information concerning driving characteristics and occupant feedback including one or a combination of rapid acceleration and braking, following closely, dangerously changing lanes or changing lanes without signaling, drifting out of a traffic lane, exceeding the speed limit, driving well under the speed limit, accelerating very slowly from stops, late braking, and a number, severity, and timing of traffic accidents.

6. The system of claim 5, wherein the processor is located on the nearby vehicle, and wherein the system further includes a transmitter on the autonomous vehicle for transmitting the information concerning driving characteristics and the occupant feedback to the processor located on the nearby vehicle.

7. The system of claim 5, wherein the processor is located at a remote server, and wherein the system further includes a transmitter on the autonomous vehicle for transmitting the information concerning driving characteristics and the occupant feedback to the processor located at the remote server.

8. The system of claim 7, wherein the remote server is configured to transmit the aspects of the driving style of the autonomous vehicle to a nearby vehicle.

9. The system of claim 5, wherein the processor is located onboard the autonomous vehicle, and wherein the system further includes a transmitter for transmitting the aspects of the driving style of the autonomous vehicle to a nearby vehicle or to a remote server.

10. The system of claim 9, wherein the transmitter is configured to transmit the aspects of the driving style of the autonomous vehicle to the remote server, and wherein the remote server is configured to transmit the aspects of the driving style of the autonomous vehicle to a nearby vehicle.

11. A method comprising:
receiving feedback from an occupant of an autonomous vehicle concerning driving characteristics associated with operation of the autonomous vehicle; and
generating a warning communicable to a human operating a nearby vehicle based on a preferred driving experience of the human operating the nearby vehicle.

12. The method of claim 11, further comprising collecting information concerning driving characteristics associated with operation of the autonomous vehicle, wherein the information concerning driving characteristics includes identifiable metrics regarding how an autonomous control system operates the autonomous vehicle including one or a combination of vehicle speed, vehicle acceleration, vehicle location, braking force, braking deceleration, vehicle speed relative to speed limit, vehicle speed in construction zones, vehicle speed in school zones, lane departures, relative speed to a vehicle driving ahead, relative distance to a vehicle driving ahead, and relative acceleration to a vehicle driving ahead.

13. The method of claim 12, further comprising sharing, with the nearby vehicle or a remote server, the information concerning driving characteristics, and wherein the characterizing occurs on the nearby vehicle.

14. The method of claim 11, further comprising:
characterizing aspects of a driving style of the autonomous vehicle, including one or more patterns including rapid acceleration and braking, following closely, dangerously changing lanes or changing lanes without signaling, drifting out of a traffic lane, exceeding a speed limit, driving well under the speed limit, accelerating very slowly from stops, late braking, and a number, severity, and timing of traffic accidents, or any combination thereof.

15. The method of claim 14, wherein the characterizing occurs onboard the autonomous vehicle.

16. The method of claim 14, further comprising sharing the aspects of the driving style of the autonomous vehicle with the human operating the nearby vehicle.

17. The method of claim 11, wherein the warning is one or more of visual, audible, or tactile.

18. The method of claim 11, further comprising automatically identifying one or more options for adjusting an operation of a nearby autonomous vehicle based on a preferred driving experience of an occupant of the nearby autonomous vehicle.

19. A non-transitory machine readable medium storing instructions that, when executed on a computing device, cause the computing device to perform a method, the method comprising:
receiving feedback from an occupant of an autonomous vehicle concerning driving characteristics associated with operation of the autonomous vehicle; and
generating a warning communicable to a human operating a nearby vehicle based on a preferred driving experience of the human operating the nearby vehicle.

20. The non-transitory machine readable medium of claim 19, further comprising collecting information concerning driving characteristics associated with operation of the autonomous vehicle, wherein the information concerning driving characteristics includes identifiable metrics regarding how an autonomous control system operates the autonomous vehicle including one or a combination of vehicle speed, vehicle acceleration, vehicle location, braking force, braking deceleration, vehicle speed relative to speed limit, vehicle speed in construction zones, vehicle speed in school zones, lane departures, relative speed to a vehicle driving ahead, relative distance to a vehicle driving ahead, and relative acceleration to a vehicle driving ahead.

* * * * *